(12) United States Patent
Bavadekar

(10) Patent No.: US 7,117,267 B2
(45) Date of Patent: Oct. 3, 2006

(54) SYSTEM AND METHOD FOR PROVIDING TUNNEL CONNECTIONS BETWEEN ENTITIES IN A MESSAGING SYSTEM

(75) Inventor: Shailesh S. Bavadekar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 686 days.

(21) Appl. No.: 09/894,318

(22) Filed: Jun. 28, 2001

(65) Prior Publication Data

US 2003/0009571 A1    Jan. 9, 2003

(51) Int. Cl.
    G06F 15/16    (2006.01)
(52) U.S. Cl. .................. 709/230; 709/227; 709/223
(58) Field of Classification Search .............. None
    See application file for complete search history.

(56) References Cited

U.S. PATENT DOCUMENTS

| | | | | |
|---|---|---|---|---|
| 5,805,803 A | * | 9/1998 | Birrell et al. ............... 713/201 |
| 5,826,023 A | * | 10/1998 | Hall et al. ................... 709/206 |
| 5,960,178 A | | 9/1999 | Cochinwala et al. |
| 5,999,964 A | | 12/1999 | Murakata et al. |
| 6,052,710 A | * | 4/2000 | Saliba et al. ................ 709/203 |
| 6,101,549 A | * | 8/2000 | Baugher et al. ............ 709/238 |
| 6,104,716 A | * | 8/2000 | Crichton et al. ............ 370/401 |
| 6,169,992 B1 | * | 1/2001 | Beall et al. ............. 707/103 R |
| 6,233,619 B1 | | 5/2001 | Narisi et al. |
| 6,279,041 B1 | | 8/2001 | Baber et al. |
| 6,507,577 B1 | * | 1/2003 | Mauger et al. ............. 370/356 |
| 6,584,567 B1 | * | 6/2003 | Bellwood et al. ........... 713/171 |
| 6,668,282 B1 | * | 12/2003 | Booth, III et al. .......... 709/224 |
| 6,721,792 B1 | * | 4/2004 | Erickson et al. ............ 709/227 |
| 6,739,511 B1 | * | 5/2004 | Tsikos et al. .......... 235/462.01 |
| 6,754,621 B1 | * | 6/2004 | Cunningham et al. ...... 704/219 |
| 2001/0023482 A1 | * | 9/2001 | Wray ......................... 713/151 |
| 2001/0036192 A1 | * | 11/2001 | Chiles et al. ............... 370/401 |
| 2002/0069292 A1 | * | 6/2002 | Gaddis et al. .............. 709/238 |
| 2002/0099826 A1 | * | 7/2002 | Summers et al. ........... 709/227 |
| 2002/0124112 A1 | * | 9/2002 | Tso ............................ 709/246 |
| 2002/0128925 A1 | * | 9/2002 | Angeles ....................... 705/26 |

(Continued)

OTHER PUBLICATIONS

"Java Message Service," Sun Microsystems, Inc. Version 1.0.1, Oct. 5, 1998, pp. 12-101.

*Primary Examiner*—Bunjob Jaroenchonwanit
*Assistant Examiner*—Dohm Chankong
(74) *Attorney, Agent, or Firm*—Robert C. Kowert; Meyertons, Hood, Kivlin, Kowert & Goetzel, P.C.

(57) ABSTRACT

A system and method for providing HTTP tunnel connections between entities such as clients and servers in a messaging system is described. An HTTP tunnel connection layer is described that may be used to provide reliable, full duplex virtual connections between entities (e.g. clients and brokers) in a distributed application environment using a messaging system. Also described is a novel HTTP tunneling protocol that may be used by the HTTP tunnel connection layer. The HTTP tunnel connection layer may be used by clients to access messaging servers through proxy servers and firewalls, thus expanding the scope of from where clients can access brokers. Using this layer, brokers as well as clients may initiate messaging system messages. This layer may also provide guaranteed data delivery with correct sequencing even in case of a failure on the network. This layer may also provide end-to-end flow control.

80 Claims, 14 Drawing Sheets

U.S. PATENT DOCUMENTS

2002/0147810 A1* 10/2002 Traversat et al. ............ 709/224
2002/0156901 A1* 10/2002 Erickson et al. ............ 709/227
2002/0194292 A1* 12/2002 King .......................... 709/213
2003/0204719 A1* 10/2003 Ben-Itzhak ................. 713/152
2005/0058136 A1* 3/2005 Lothberg et al. ......... 370/395.3
2005/0166209 A1* 7/2005 Merrick et al. ............. 719/310

* cited by examiner

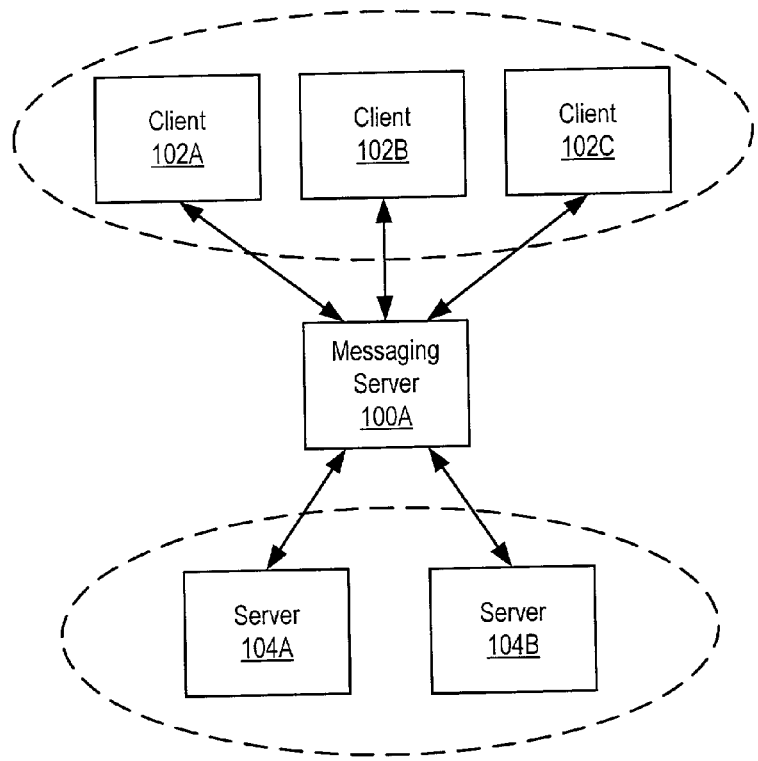
Figure 1 - Prior Art
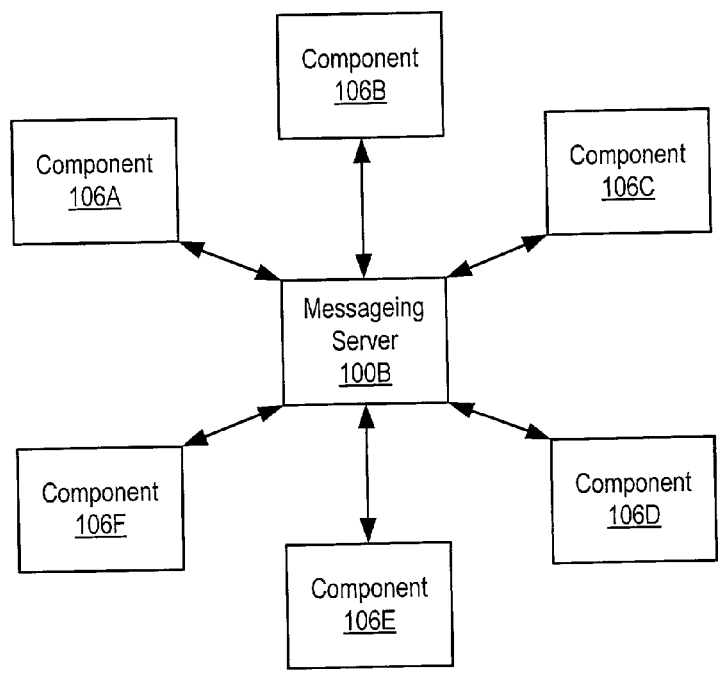
Figure 2 - Prior Art

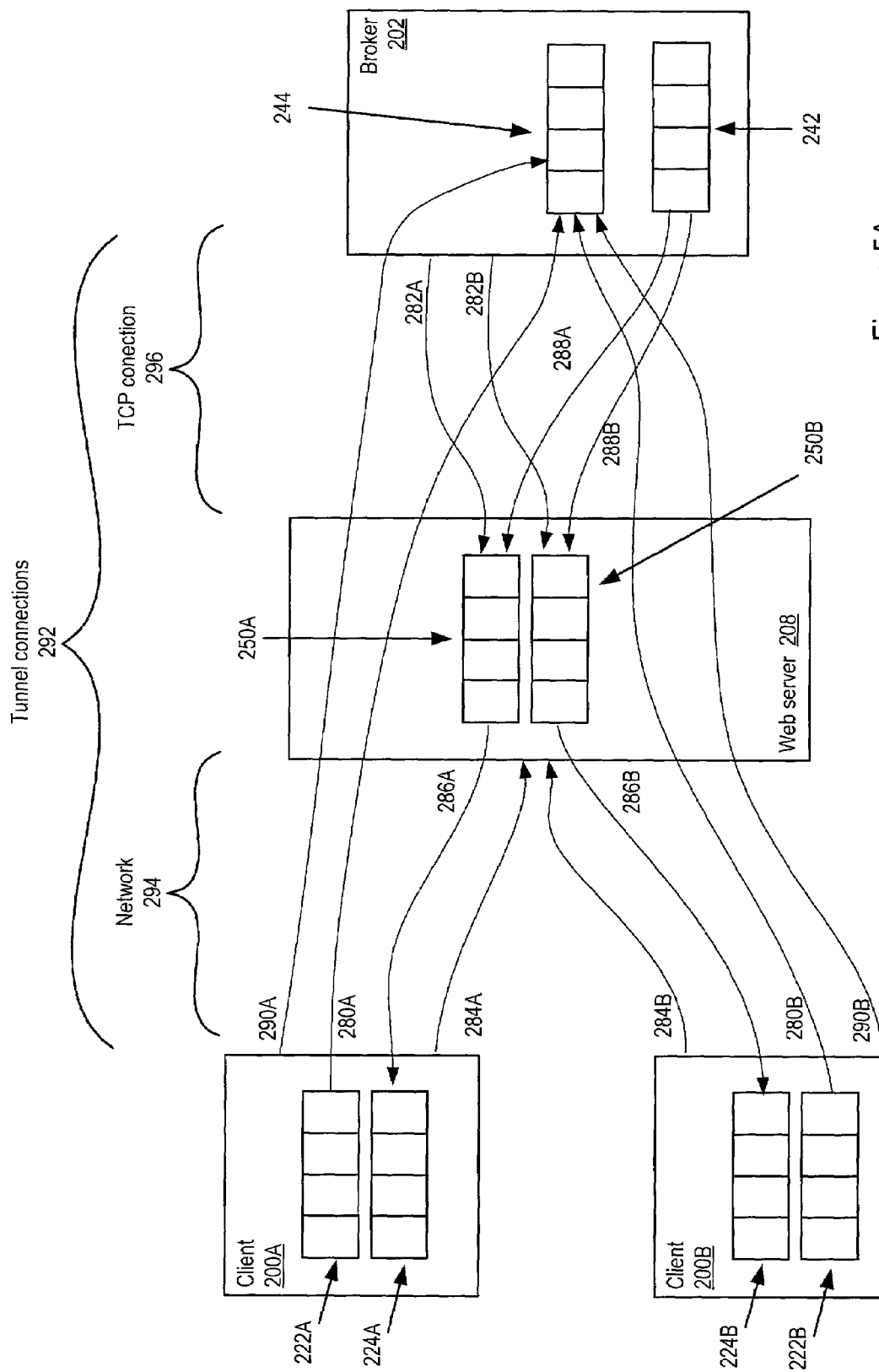

Exemplary tunneling packet format

SYSTEM AND METHOD FOR PROVIDING TUNNEL CONNECTIONS BETWEEN ENTITIES IN A MESSAGING SYSTEM

BACKGROUND OF THE INVENTION

1. Field of the Invention

This invention relates to computers and networks of computers, and more particularly to a system and method for providing transport protocol tunnel connections between entities or nodes such as clients and servers in a messaging system.

2. Description of the Related Art

Messaging is playing an increasingly important role in computing. Its advantages are a natural result of several factors: the trend toward peer-to-peer computing, greater platform heterogeneity, and greater modularity, coupled with the trend away from synchronous communication between processes. The common building block of a messaging service is the message. Messages are specially formatted data describing events, requests, and replies that are created by and delivered to computer programs. Messages contain formatted data with specific meanings. Messaging is the exchange of messages to a messaging server, which acts as a message exchange program for client programs. A messaging server is a middleware program that handles messages that are sent by client programs for use by other programs. Typically, client programs access the functionality of the messaging system using a messaging application program interface (application program interface). A messaging server can usually queue and prioritize messages as needed, and thus saves each of the client programs from having to perform these services. Rather than communicate directly with each other, the components in an application based around a message service send messages to a message server. The message server, in turn, delivers the messages to the specified recipients There are two major messaging system models: the point-to-point model and the publish and subscribe model. Messaging allows programs to share common message-handling code, to isolate resources and interdependencies, and to easily handle an increase in message volume. Messaging also makes it easier for programs to communicate across different programming environments (languages, compilers, and operating systems) since the only thing that each environment needs to understand is the common messaging format and protocol. The messages involved exchange crucial data between computers—rather than between users—and contain information such as event notification and service requests. IBM's MQSeries and iPlanet Message Queue are examples of products that provide messaging interfaces and services.

FIG. 1 illustrates a typical messaging-based application. This application is a modification of the traditional client/server architecture. The major difference is the presence of a messaging server 100A between client 102 and server 104 layers. Thus, rather than communicating directly, clients 102 and servers 104 communicate via the messaging server 100A. The addition of the messaging server 100A adds another layer to the application, but it greatly simplifies the design of both the clients 102 and the servers 104 (they are no longer responsible for handling communications issues), and it also enhances scalability. Note that servers in a messaging system may also be referred to as "brokers".

FIG. 2 illustrates another messaging-based application based on point-to-point architecture. This type of application almost demands a centralized messaging server 100B. Without one, each component 106 would be responsible for creating and maintaining connections with the other components 106. A possible alternative approach would be to architect the system around a communication bus, but this would still leave each component 106 in charge of message delivery issues.

Java Message Service (JMS)

Java Message Service (JMS) is an application program interface (API) from Sun Microsystems that supports messaging between computers in a network. JMS provides a common interface to standard messaging protocols and also to special messaging services in support of Java programs. Sun advocates the use of the JMS for anyone developing Java applications, which can be run from any major operating system platform. Using the JMS interface, a programmer can invoke the messaging services of IBM's MQSeries, Progress Software's SonicMQ, and other messaging product vendors.

The JMS API may:

Provide a single, unified message API

Provide an API suitable for the creation of messages that match the format used by existing, non-JMS applications Support the development of heterogeneous applications that span operating systems, platforms, architectures, and computer languages Support messages that contain serialized Java objects Support messages that contain eXtensible Markup Language (XML) pages Allow messages to be prioritized Deliver messages either synchronously or asynchronously Guarantee messages are delivered once and only once Support message delivery notification Support message time-to-live Support transactions The JMS API is divided into two nearly identical pieces. One implements a point-to-point model of messaging, and the other implements a publish and subscribe model of messaging. Each of these models is called a domain. The APIs are almost identical between the domains. The separation of the API into two domains relieves vendors that support only one messaging model from providing facilities their product doesn't natively support.

Enterprise Messaging Systems

Enterprise messaging systems may be developed using a messaging service such as JMS. An enterprise messaging system may be used to integrate distributed, loosely coupled applications/systems in a way that provides for dynamic topologies of cooperating systems/services. Enterprise messaging systems typically need to address common messaging related problems such as:

Guaranteed message delivery (e.g. persistence, durable interests, "at least once" and "once and only once" message delivery guarantees, transactions etc). Messages from one component to another must not be lost due to network or system failure. This means the system must be able to guarantee that a message is successfully delivered.

Asynchronous delivery. For large numbers of components to be able to exchange messages simultaneously, and support high density throughputs, the sending of a message cannot depend upon the readiness of the consumer to immediately receive it. If a consumer is busy or offline, the system must allow for a message to be sent and subsequently received when the consumer is ready. This is known as asynchronous message delivery, popularly known as store-and-forward messaging.

Various message delivery models (e.g. publish and subscribe or point-to-point).

Transport independence.

Leveraging an enterprise messaging system in developing business solutions allows developers to focus on their application/business logic rather than on implementing the underlying messaging layer.

iPlanet E-Commerce Solutions' iMQ (iplanet Message Queue), formerly offered by Sun Microsystems as JMQ (Java Message Queue) is an example of an enterprise messaging system, and was developed to be JMS-compliant. iMQ may use a "hub and spoke" architecture. Clients use an iMQ client library to exchange messages with an iMQ message server (also referred to as a "broker").

In an enterprise messaging system, clients exchange messages with a messaging server using a message exchange protocol. The messaging server then may route the messages based upon properties of the messages. Typically, the message exchange protocol requires a direct, fully bi-directional reliable transport connection between the client and the messaging server, such as a TCP (Transport Control Protocol) or SSL (Secure Sockets Layer) connection, which can be used only if the client and the messaging server both reside on the "intranet" (i.e. on the same side of a firewall).

Hypertext Transfer Protocol

The Hypertext Transfer Protocol (HTTP) is a set of rules for exchanging files (text, graphic images, sound, video, and other multimedia files) on the World Wide Web. HTTP may also be used on an intranet. Relative to the TCP/IP suite of protocols (which are the basis for information exchange on the Internet), HTTP is an application protocol that is implemented over TCP/IP. HTTP was designed as a stateless request-response mechanism.

A Web server is a program that, using the client/server model and HTTP, serves the files that form Web pages to Web users (whose computers contain HTTP clients that forward their requests). Every computer on the Internet that contains a Web site must have a Web server. A Web server machine may include, in addition to the Hypertext Markup Language (HTML) and other files it can serve, an HTTP daemon, a program that is designed to wait for HTTP requests and handle them when they arrive. A Web browser is an example of an HTTP client that sends requests to server machines. When a browser user enters file requests by either "opening" a Web file by typing in a URL (Uniform Resource Locator) or clicking on a hypertext link, the browser builds an HTTP request and sends it to the Internet Protocol (IP) address indicated by the URL. The HTTP daemon in the destination server machine receives the request and, after any necessary processing, the requested file is returned.

Tunneling

Tunneling may be defined as the encapsulation of a protocol A within protocol B, such that A treats B as though it were a data link layer. Tunneling may be used to get data between administrative domains that use a protocol that is not supported by the Internet connecting those domains. A "tunnel" is a particular path that a given message or file might travel through the Internet.

Proxy Servers and Firewalls

In an enterprise that uses the Internet, a proxy server is a server that acts as an intermediary between a workstation user and the Internet so that the enterprise can ensure security, administrative control, and caching service. A proxy server may be associated with or part of a gateway server that separates the enterprise network from the outside network and a firewall server that protects the enterprise network from outside intrusion.

A firewall is a set of related programs, usually located at a network gateway server, that protects the resources of a private network from users from other networks. An enterprise with an intranet that allows its workers access to the wider Internet installs a firewall to prevent outsiders from accessing its own private data resources and for controlling what outside resources its own users have access to.

SUMMARY OF THE INVENTION

A system and method for providing transport protocol tunnel connections between entities such as clients and servers in a messaging system is described. A transport protocol tunnel connection layer is described that may be used to provide reliable, full duplex virtual connections between entities (e.g. clients and servers) in a distributed application environment using a messaging system. This layer may be used by clients to access messaging servers (referred to as brokers) through proxy servers and firewalls, thus expanding the scope of from where clients can access brokers. This layer allows for information flow in both directions between the client and the server. Using this layer, brokers as well as clients may initiate messages in the distributed application environment. This layer may also provide guaranteed data delivery with correct sequencing even in case of a failure on the network. This layer may also provide end-to-end flow control.

The transport protocol tunnel connection layer may provide a connection-oriented, bi-directional byte stream service between nodes in a messaging system. Application data, including messages, may be carried as transport protocol packet payloads. The transport protocol tunnel connection layer allows messaging system clients to access messaging system brokers using the transport protocol instead of using direct TCP connections. This enables the clients to access the brokers through firewalls. Also, with the help of a transport protocol proxy, the clients may access the messaging service even when there is no direct IP connectivity with the broker.

Using embodiments of the transport protocol tunnel connection layer, a transport protocol tunnel connection between the client and the broker in the messaging system may be established. The client may then generate one or more messaging system messages. In one embodiment, the generated messages may then be stored in a client-side transmit buffer. One or more transport protocol packets encapsulating the one or more messages may then be generated on the client. In one embodiment, a client-side tunnel connection driver may generate the packets and include the messages as payloads of the packets. The one or more transport protocol packets may then be transmitted to the broker via the tunnel connection. In one embodiment, the client-side tunnel connection driver may handle the transmission of the packets.

A Web server may then receive the one or more transport protocol packets. The Web server may then forward the received transport protocol packets to the broker. In one embodiment, the packets may be forwarded to the broker via a TCP connection serving as one segment of the transport protocol tunnel connection between the Web server and the broker. In one embodiment, a transport protocol tunnel servlet on the Web server node may serve as an interface between the Web server and the TCP connection.

The broker may receive the transport protocol packets from the Web server. In one embodiment, a broker-side transport protocol tunnel driver may receive the packets. In one embodiment, the broker may extract the messaging system messages from the transport protocol packets and store the messages in a broker-side receive buffer. In another embodiment, the entire transport protocol packet may be stored in the broker-side receive buffer.

The broker may acknowledge receipt of the packets by sending one or more acknowledgement (ACK) packets to the client via the tunnel connection. The broker may generate and send one or more acknowledgement (ACK) packets to the Web server. In one embodiment, the broker may store ACK packets in a broker-side transmit buffer. In one embodiment, the ACK packets may be sent to the Web server over the TCP connection. In one embodiment, the broker-side transport protocol tunnel driver may handle the transmission of the ACK packets to the Web server.

The Web server may then receive the ACK packets. In one embodiment, a transport protocol tunnel servlet may receive the packets for the Web server. The Web server may store the acknowledgement packets in a transport protocol packet buffer. At some point, the client may send a transport protocol pull request packet to the Web server. In one embodiment, the client may periodically send pull requests to the Web server. In one embodiment, a separate thread on the client may handle periodically sending pull requests. The Web server may transmit to the client the one or more transport protocol ACK packets stored in the transport protocol packet buffer associated with the client in response to receiving the pull request packet. The client may then receive the one or more ACK packets. The ACK packets may serve to acknowledge the receipt of the transmitted data so that the sender may free its transmit buffers.

Using embodiments of the transport protocol tunnel connection layer, messaging system messages may be generated on a broker and sent to a client. In one embodiment, the generated messages may be stored in a broker-side transmit buffer. One or more transport protocol packets encapsulating the one or more messages may then be generated on the broker. In one embodiment, a broker-side transport protocol tunnel connection driver may generate the transport protocol packets and include the messages as payloads of the packets. The one or more transport protocol packets may then be transmitted to the client via the transport protocol tunnel connection. In one embodiment, the broker-side transport protocol tunnel connection driver may handle the transmission of the packets. In one embodiment, the transport protocol packets may be sent to a Web server. In one embodiment, the transport protocol packets may be sent to the Web server over a TCP connection.

The Web server may receive the transport protocol packets and store the received packets in a transport protocol packet buffer. In one embodiment, a transport protocol tunnel servlet may receive the packets for the Web server. At some point, the client may send a transport protocol pull request packet to the Web server. The Web server may transmit to the client one or more transport protocol packets stored in the transport protocol packet buffer associated with the client in response to receiving the pull request packet.

The client may then receive the one or more transport protocol packets. In one embodiment, the client may store the received transport protocol packets in a client-side receive buffer. After receiving the transport protocol packets, the client may acknowledge receipt of the packets by sending one or more acknowledgement (ACK) packets to the broker via the transport protocol tunnel connection. The Web server may receive the ACK packets and forward the received ACK packets to the broker. In one embodiment, the ACK packets may be transmitted to the broker via a TCP connection between the Web server and the broker that serves as one segment of the HTTP tunnel connection. The broker may receive the ACK packets from the Web server. In one embodiment, the received ACK packets may be stored in a broker-side receive buffer.

In one embodiment, one Web server and one tunnel servlet may be used by two or more clients to communicate to a broker via tunnel connections. In this embodiment, the HTTP tunnel servlet may multiplex transport protocol packets from the two or more clients onto the TCP connection. In one embodiment, the tunnel servlet may extract the messaging system message information from received transport protocol packets and send only the message information to the broker over the TCP connection. In one embodiment, there may be one broker-side receive buffer for each tunnel connection. In another embodiment, a single receive buffer may be used for two or more tunnel connections.

Transport protocol packets may optionally pass through a proxy server and one or more firewalls. For example, transport protocol packet flow from a client to a broker may pass through a proxy server, through a firewall onto the Internet, through another firewall to a Web server, and from the Web server over a TCP connection to the broker. Packets flowing in the opposite direction (from the broker to the client) take the reverse path.

In one embodiment, transport protocol packets transmitted on the tunnel connection may include message sequence information configured for use by the receiver in processing received messages in the correct sequence. In one embodiment, flow control may be applied to the sending of messages from a sender to a receiver. In one embodiment, the receiver may inform the sender of available space in a receive buffer to store incoming messages. In one embodiment, upon establishment of a tunnel connection, each side (both clients and brokers can be senders and/or receivers) may inform the other of its receive buffer size. In one embodiment, ACK packets sent to a sender by a receiver may each include the currently available space in the receive buffer. Thus, the sender can keep track of the current receive capacity of the receiver.

BRIEF DESCRIPTION OF THE DRAWINGS

FIG. 1 illustrates a prior art messaging-based application based upon client/server architecture;

FIG. 2 illustrates a prior art messaging-based application based on point-to-point architecture;

FIG. 5A illustrates the routing of transport protocol packets between clients and a broker on transport protocol tunnel connections according to one embodiment;

Figure 3A:
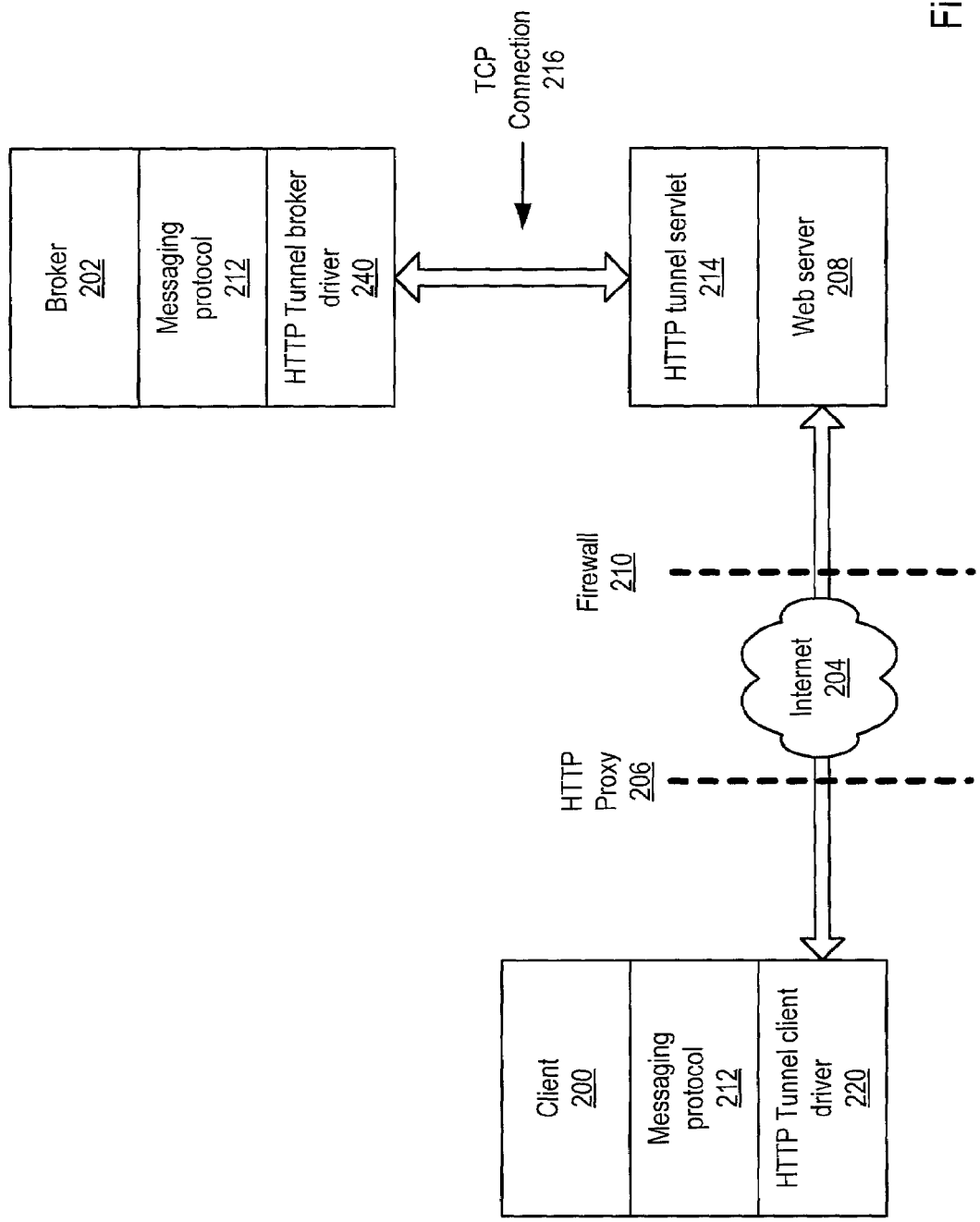
FIG. 3A illustrates a client-server messaging system implementing a transport protocol tunnel connection layer according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing transport protocol tunnel connections between entities such as clients and servers in a messaging system is described. A transport protocol tunnel connection layer is described that may be used to provide reliable, full duplex virtual connections between entities (e.g. clients and servers) in a distributed application environment using a messaging system. This layer may be used by clients to access messaging servers (referred to as brokers) through proxy servers and firewalls, thus expanding the scope of from where clients can access brokers. Using this layer, brokers as well as clients may initiate messages in the distributed application environment. This layer may also provide guaranteed data delivery with correct sequencing even in case of a failure on the network. This layer may also provide end-to-end flow control. The transport protocol tunnel connection layer may be used to simulate virtual connections that have a similar contract with the upper layers (e.g. clients and brokers) as a TCP connection. Thus, applications can be developed in terms of messages without concern for the particular underlying connection protocol. Decisions about the best communications protocol between clients and brokers may be postponed until deployment time when the particular network requirements of an installation are known.

The transport protocol tunnel connection layer may use a novel tunneling protocol to overcome limitations of the underlying transport protocol in the messaging environment. A transport protocol may be designed as a stateless request-response mechanism, and thus may not fit the enterprise messaging system protocol model very well. For example, enterprise messaging system applications may expect asynchronous message delivery whereas a transport protocol may use a synchronous request response model. As another example, each transport protocol request-response exchange may carry a finite amount of data and is usually short lived. Thus, an enterprise messaging system message may be delivered using multiple transport protocol requests. However there may be no correlation between transport protocol requests generated by the same client. The Web servers and transport protocol intermediaries (e.g. proxy servers) thus cannot guarantee that the transport protocol requests will be processed in the same sequence as they were sent. As yet another example, TCP protocol uses a flow control mechanism to limit the network resource usage. If an enterprise messaging system message sender application generates messages very rapidly, and if each message is sent to the server using a separate transport protocol request or multiple transport protocol requests, resources on the transport protocol servers and intermediaries may be exhausted. As still yet another example, an enterprise messaging system client application may maintain a connection and a steady message exchange rate over very long periods of time (many days or even months). If the transport protocol is used, a failure on a common transport protocol proxy server may disrupt the communication between the client application and the enterprise messaging system broker.

The transport protocol tunnel connection layer may provide a connection-oriented, bi-directional byte stream service between nodes in a messaging system. Transport protocol messages may be carried as transport protocol packet payloads. The transport protocol tunnel connection layer may allow messaging system clients to access messaging system brokers using the transport protocol instead of using direct TCP connections. This enables the clients to access the brokers through firewalls. Also, with the help of a transport protocol proxy, the clients may access the messaging service even when there is no direct IP connectivity with the broker.

Using the transport protocol tunnel connection layer, if a client is separated from a broker by a firewall, messaging may be run on top of transport protocol connections, which are normally allowed through firewalls. On the client side, a transport protocol transport driver may encapsulate messages into transport protocol packets, and also may ensure that these packets are sent to the Web server in the correct sequence. The client may use a transport protocol proxy server to communicate with the broker if necessary. In one embodiment, a transport protocol tunnel servlet executing within a Web server may receive the transport protocol packets and forward the entire transport protocol packets (including the message data) to the broker. In another embodiment, the transport protocol tunnel servlet executing within the Web server may be used to pull client data (messages) out of the transport protocol packets before forwarding the data to the broker. In one embodiment, the tunnel servlet may multiplex message data from multiple clients onto one TCP connection to the broker, thus allowing the use of one tunnel servlet for multiple clients. The transport protocol tunnel servlet may also send broker data (messages) to the client in response to transport protocol pull requests. On the broker side, a transport protocol transport driver may unwrap and demultiplex incoming messages from the transport protocol tunnel servlet. The transport protocol tunnel connection layer may also be used by brokers to initiate communications with a client.

Though embodiments of the system and method are described herein as providing Hypertext Transport Protocol (HTTP) tunnel connections between entities such as clients and servers in a messaging system, it is noted that embodiments of the system and method using other unreliable/connectionless transport protocols that may not have built-in TCP support such as UDP (User Datagram Protocol), IrDA (Infrared Data Association), IBM's SNA (Systems Network Architecture), Novell's IPX (Internetwork Packet eXchange), and Bluetooth are contemplated. These embodiments may be used to provide tunnel connections between entities in messaging systems using the other transport protocols.

FIG. 3A illustrates a client-server messaging system implementing an HTTP tunnel connection layer according to one embodiment. Client 200 may generate messages using the messaging protocol 212. In one embodiment, an Application Programming Interface (API) to the messaging protocol may be used by the client application to generate the messages. In one embodiment, the messaging protocol is the Java Message Service (JMS). Other messaging protocols may be used. Generated messages may then be passed to the HTTP tunnel client driver 220.

The HTTP tunnel client driver 220 may then send the messages as HTTP POST request payloads. The HTTP tunnel client driver 220 may also use separate HTTP requests to periodically pull any data sent by the other end of the connection. The HTTP requests may be sent through HTTP proxy 206, Internet 204, and firewall 210 to Web server 208. On Web server 208, the HTTP tunnel servlet 214 may act as a transceiver and may multiplex the HTTP requests from multiple clients onto a single TCP connection 216 with the broker 202. The HTTP tunnel broker driver 240 may receive the HTTP requests from the Web server 210 over TCP connection 216.

Note that the HTTP proxy 206 and/or the firewall 210 are optional. In other words, the HTTP tunnel connection layer is configurable to transmit messages encapsulated in HTTP requests between entities over the Internet 104 both with and without the messages passing through proxies and/or firewalls. Also note that the Web server 208, HTTP tunnel servlet 214, and the broker 202 may be implemented on the same host machine or on different host machines. Note also that a Web server 208 and HTTP tunnel servlet 214 may be used to access multiple brokers 202.

In one embodiment, the packet delivery service provided by the HTTP tunnel drivers may occasionally lose packets. Hence the HTTP tunnel connection layer may use positive acknowledgements of received packets, and may retransmit any lost packets. When a receiver receives a packet including a message, the receiver responds to the packet by sending an acknowledgement packet to the sender.

In one embodiment, the HTTP tunnel connection layer may use a sliding window protocol to implement packet sequencing and flow control on top of HTTP. In a distributed application environment using a messaging service, quite often entities may need to send a stream of packets, without errors, and with guaranteed order of delivery (i.e. that the packets are received in the order they are sent). HTTP does not guarantee packets to be received by a receiver (e.g. broker) in the same order the packets were sent by a transmitter (e.g. client). Also, HTTP does not provide a method to control the rate at which packets are sent to a receiver, thus running the risk of exhausting network resources on the receiver and losing packets. Using a sliding window protocol provides the ability to control the rate at which packets are transmitted to a receiver. The sliding window protocol may be used to guarantee that no more than a fixed number of packets are transmitted to a receiver. The fixed number of packets may be determined by a receive buffer size on the receiver. For example, a receiver may be able to receive a maximum of 100 packets from a sender. If the sender initially transmits 70 packets, the receiver may receive the packets and process 20 of them. The receiver may send a packet or packets to notify the sender that the receiver can receive 50 packets. The sender may then transmit 30 more packets. The receiver may receive the 30 packets, and in the meantime may have processed 20 more of the original 70 packets. The receiver may then transmit a packet or packets to notify the sender that the receiver can receive 60 packets (there are still 10 of the original 70 packets and the 30 new packets in the receive buffer). Thus, the sender never sends more packets to the receiver than the quantity of packets the receiver has notified the sender it can receive.

In one embodiment, when a connection is established between two entities or nodes (e.g. a server and client), each node may inform the other of how many packets it can initially receive. In a network, a node is a connection point, either a redistribution point or an end point for data transmissions. In general, a node has programmed or engineered capability to recognize, process and/or forward transmissions to other nodes. In one embodiment, each packet received by the receiver may be acknowledged with a packet sent to the sender. The acknowledgement packets may each include information indicating the current receive buffer size (i.e. the number of packets that the receiver can currently receive). Thus, the sender can determine the number of packets that it can send to the receiver without overwhelming the sender.

In one embodiment, the client 200, broker 202 and the messaging protocol layers 212 may function similarly whether the underlying transport protocol is TCP or HTTP. In one embodiment, the messaging protocol layers 212 on both the client and the broker may use the same basic design and threading model for TCP and HTTP support. In one embodiment, an enterprise messaging system using the HTTP tunneling protocol may allow a messaging system application to exchange messages using the TCP, HTTP, SSL, or other protocol by changing appropriate configuration parameters at runtime. Thus, the application developer may not have to write any transport specific code. A client library and the broker 202 may handle the transport-specific details.

Figure 3B:
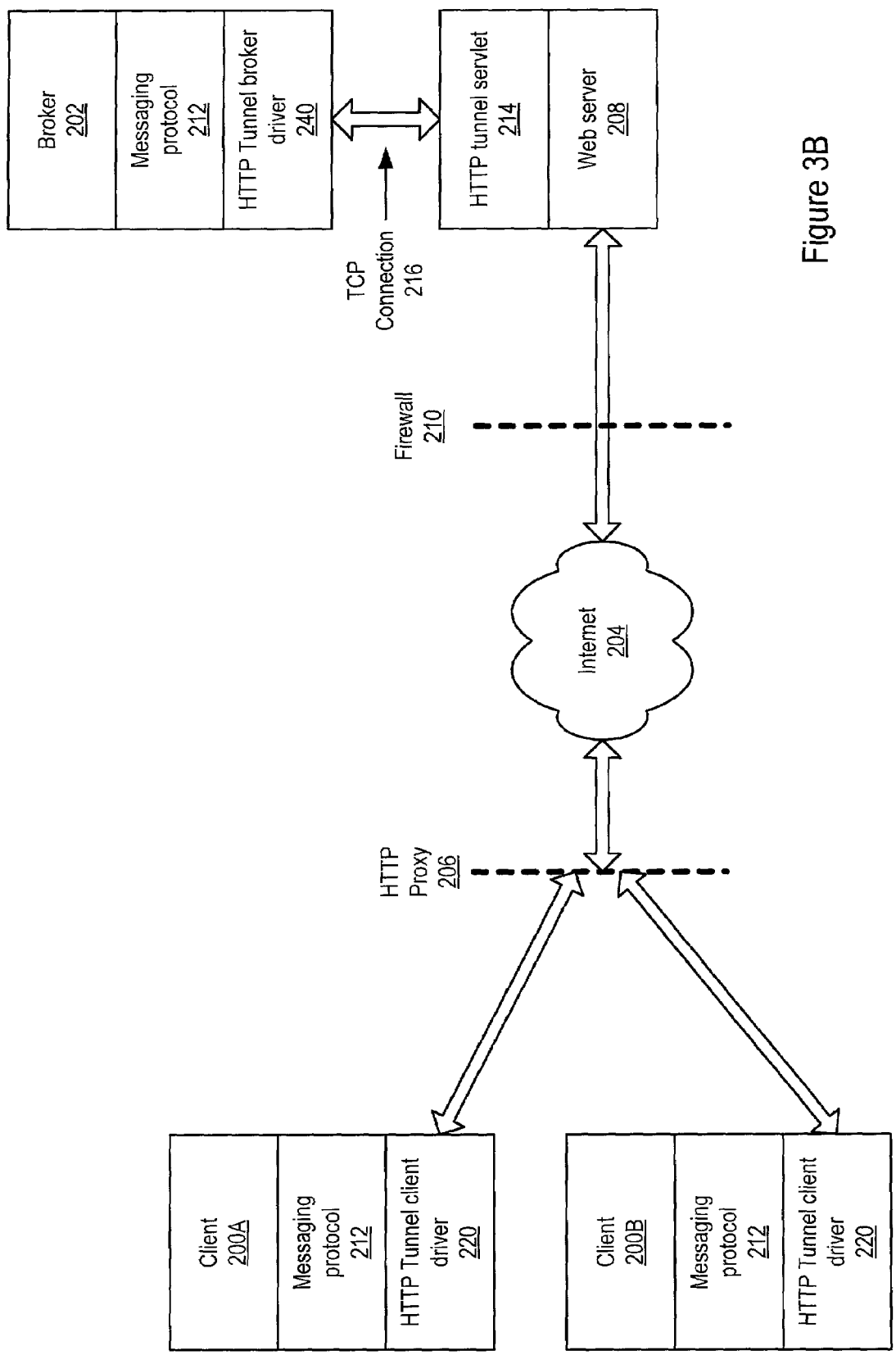
FIG. 3B illustrates a client-server messaging system implementing a transport protocol tunnel connection layer with multiple clients accessing a broker through a Web server according to one embodiment.

FIG. 3B illustrates a client-server messaging system implementing the HTTP tunnel connection layer with multiple clients accessing a broker through a Web server according to one embodiment. Both brokers 202A and 202B may have registered with Web server 208 that they are ready to receive connections from clients. Client 200A may establish an HTTP tunnel connection to broker 202A through Web server 208. Client 200B may establish an HTTP tunnel connection to broker 202B through Web server 208. At some point, either client may establish an HTTP tunnel connection with the other broker. Thus, a client may have multiple HTTP tunnel connections open to different brokers, and multiple clients may have HTTP tunnel connections open to one broker.

Figure 4:
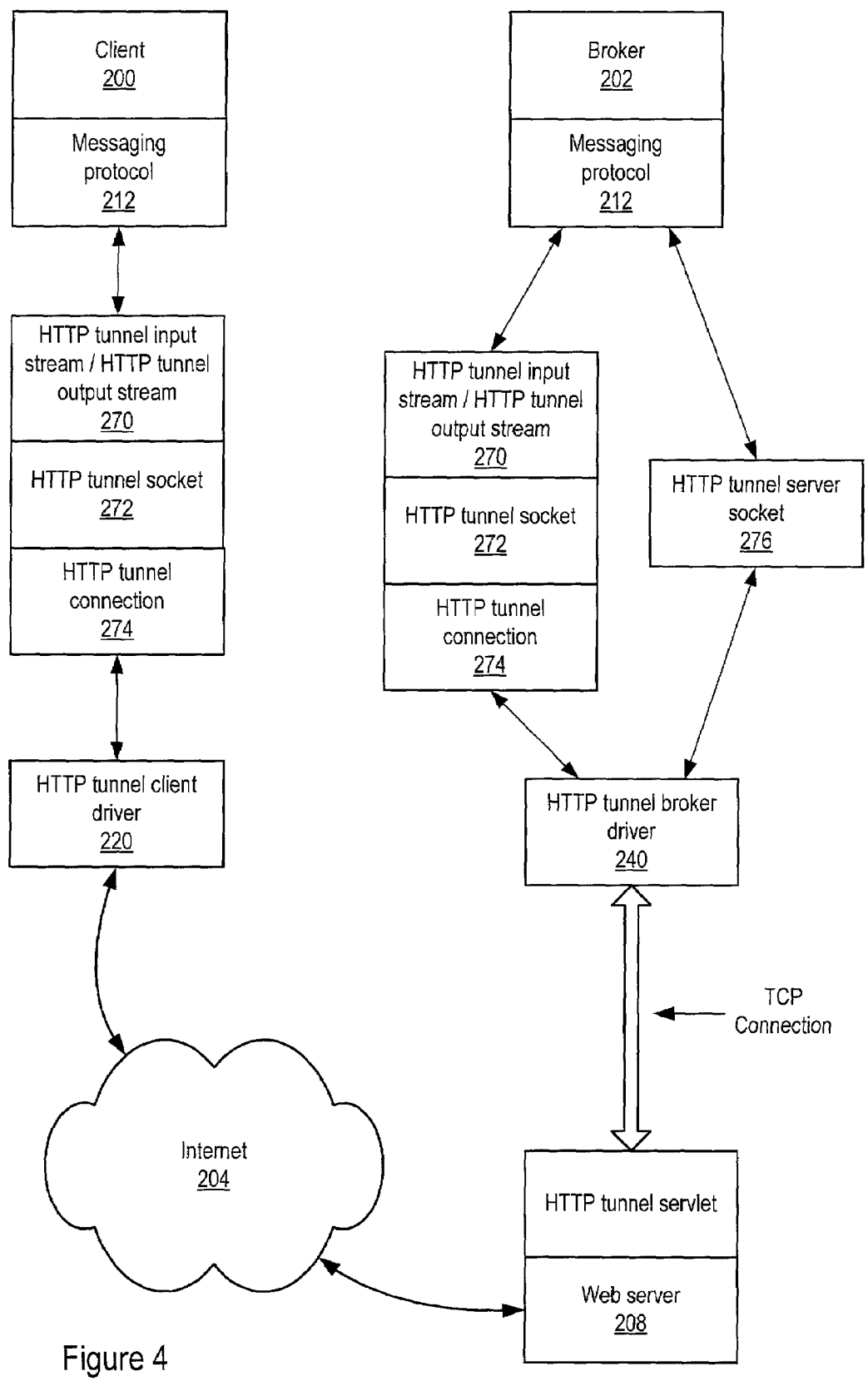
FIG. 4 illustrates the architecture of a client-server messaging system implementing a transport protocol tunnel connection layer according to one embodiment.

FIG. 4 illustrates the architecture of a client-server messaging system implementing the HTTP tunnel connection layer according to one embodiment. Various components that are comprised in the network protocol stack for the HTTP tunnel connection layer are shown. These components lie between the application (client or broker) and the HTTP tunnel driver (client or broker). These components may include an HTTP tunnel input stream/HTTP tunnel output stream 270, an HTTP tunnel socket 272, and an HTTP tunnel connection 274. In one embodiment, these components may be implemented as classes. In one embodiment, these components may be implemented as Java classes.

The HTTP tunnel drivers may send one request or receive one packet at a time. The primary responsibility of these drivers is to make sure that single packets are sent and/or received. This driver may not be aware of or be involved directly in the ordering, flow control or acknowledgement of packets.

The HTTP tunnel connection component 274 may interpret received packets. This component may be responsible for the sliding window protocol implementation. This component may be responsible for buffering the packets, may implement flow control, reordering and other aspects of the HTTP tunneling protocol. This component may be the primary component that is used to implement the end-to-end HTTP tunnel "virtual" connection as described herein.

The HTTP tunnel socket 272 and input and output streams 270 provide an interface between the application (e.g. client or broker) and the HTTP tunnel connection 274. These components may include simple, atomic methods such as read, write and open connection methods that provide an abstract interface to the HTTP tunnel connection 274 for the applications, and thus may hide the HTTP tunnel connection implementation from the applications.

HTTP tunnel server socket 276 may be used by broker 202 to open a listening socket to the Web server 208 to allow the Web server to create a listening endpoint for the broker 202. In doing so, broker 202 is establishing that it is ready to accept HTTP tunnel connections through Web server 208. Thus, when client 200 desires to open an HTTP tunnel connection to broker 202, the client may contact Web server 208 with a packet including information identifying broker 202. Web server 208 may examine the packet and forward the packet to broker 202, where an HTTP tunnel connection to client 200 may be established. Note that one or more HTTP packet buffers may be allocated on Web server 208 for the newly established HTTP tunnel connection. Thus, a client 200 initiates a connection, and a broker 202 accepts the connection. In one embodiment, brokers 202 cannot initiate connections to clients. Therefore, once an HTTP tunnel connection between a client 200 and a broker 202 is open (initiated by the client 200), the client 200 may keep the connection open so that if the broker 202 has data to send to the client, there is a communications link established for the broker to send messages to the client on. In one embodiment, the broker 202 never sends HTTP packets directly to the client 200; the packets are buffered on Web server 208, and pulled from the Web server periodically by the client 200.

Figure 5B:
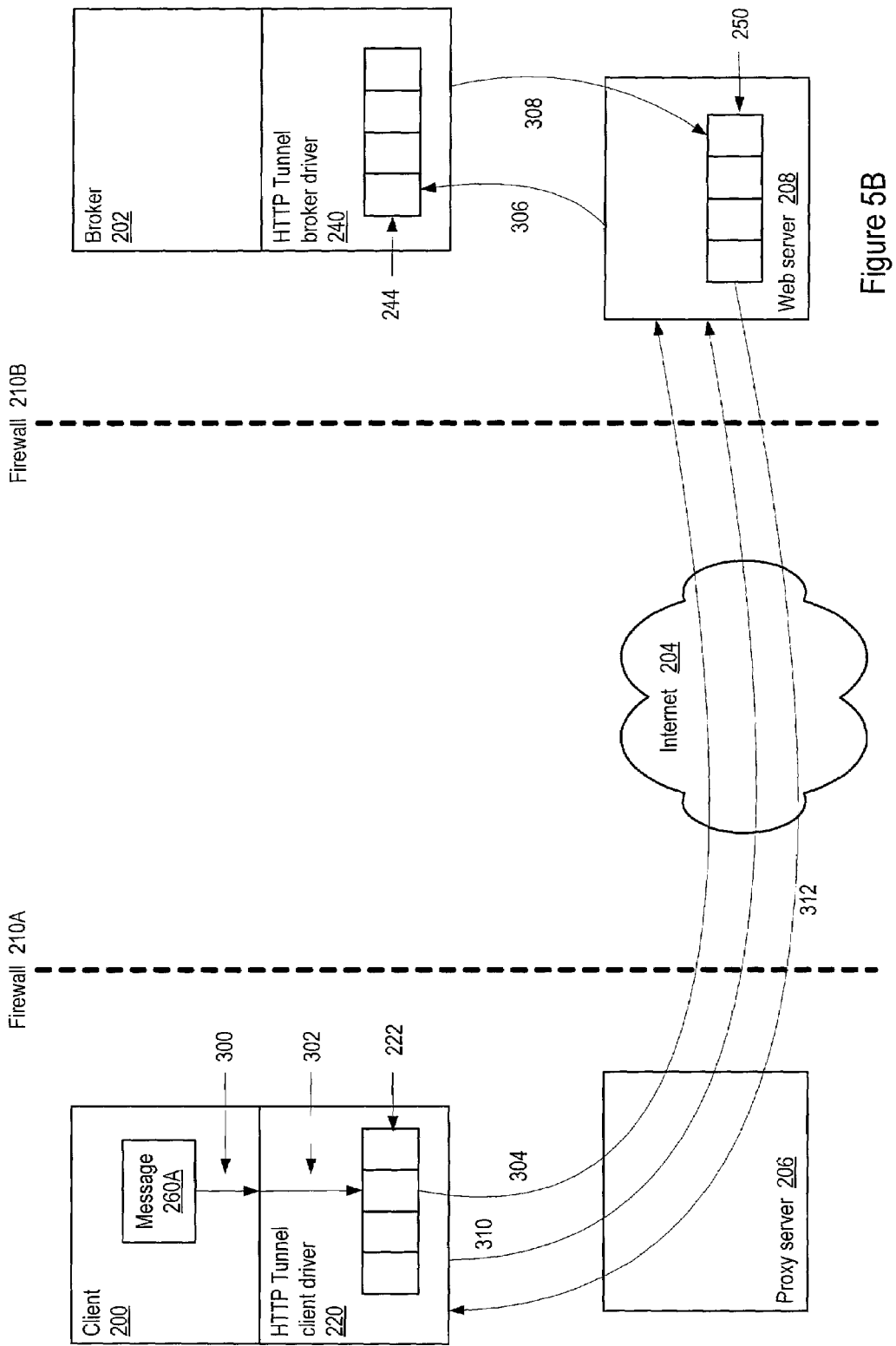
FIG. 5B illustrates the process of sending a message from a client to a broker via a transport protocol tunnel connection according to one embodiment.
Figure 5C:
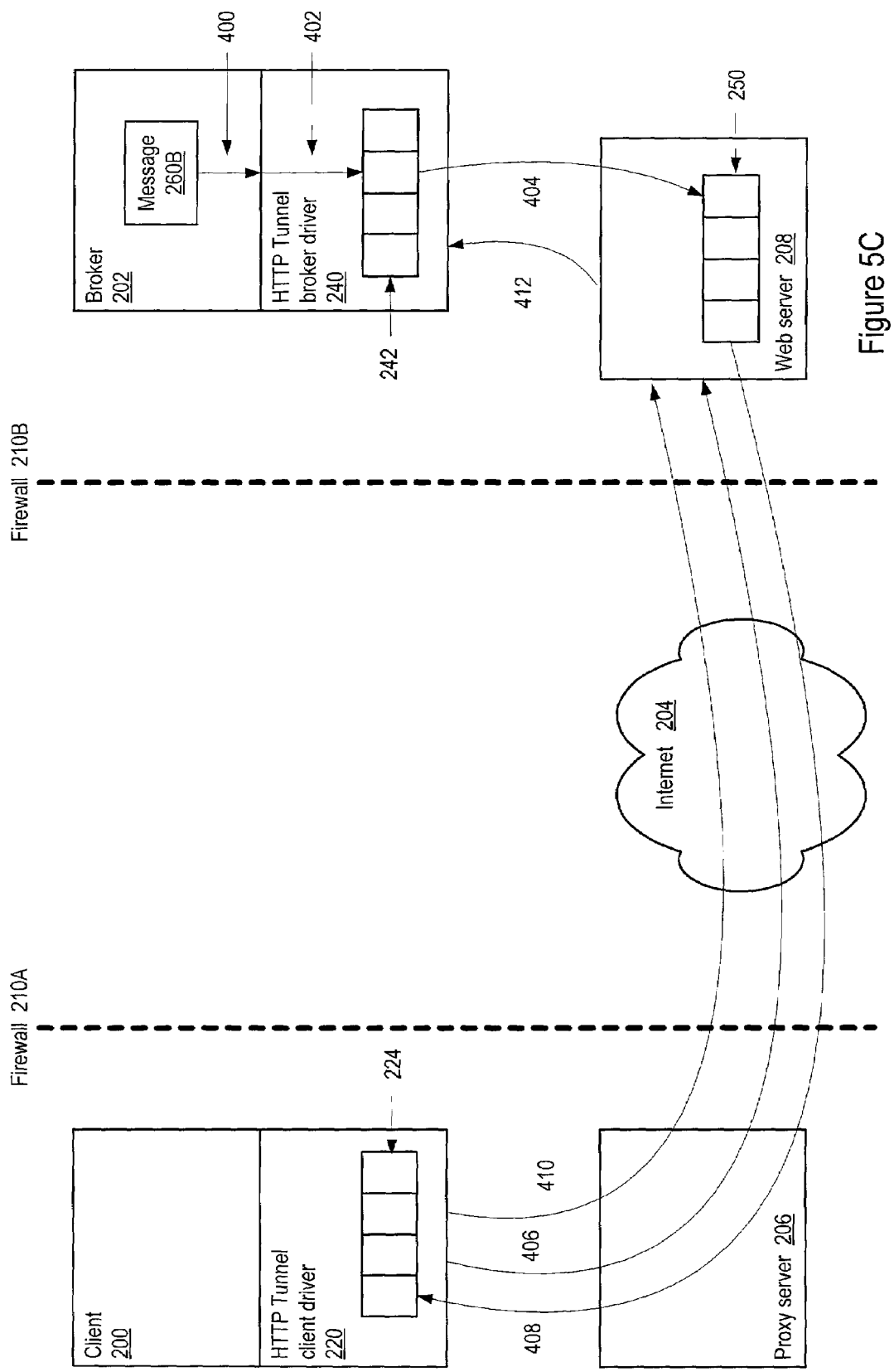
FIG. 5C illustrates the process of sending a message from a broker to a client via a transport protocol tunnel connection according to one embodiment.

FIGS. 5A through 5C are data flow diagrams illustrating the operation of a client-broker messaging system implementing the HTTP tunnel connection layer according to one embodiment. FIG. 5A illustrates the routing of HTTP packets between clients 200 and a broker 202 on HTTP tunnel connections 292 according to one embodiment. Each client 200 may include at least one client-side transmit buffer 222 and at least one client-side receive buffer 224. Broker 202 may include at least one broker-side receive buffer 244 and at least one broker-side transmit buffer 242. Each client 200 may establish an HTTP tunnel connection 292 to broker 202, which may pass through network 294, through Web server 208, and over a TCP connection 296 to broker 202. There may be a single TCP connection 296 between Web server 208, or alternatively a TCP connection 296 may be established for each HTTP tunnel connection 292. In passing through network 294, an HTTP tunnel connection 292 may pass through a proxy server (not shown) and/or through one or more firewalls (not shown).

Clients 200 may generate messaging system messages, which may be buffered in a client-side transmit buffer 222. Buffering message data may allow messages to be retransmitted if necessary, for example. The clients 200 may generate HTTP packets that include the message data as payloads and transmit the HTTP message packets to broker 202 via the HTTP tunnel connections 292 as indicated at 280A and 280B. Web server 208 may receive the HTTP message packets from network 294 and forward the packets to broker 202 over a TCP connection 296.

Broker 202 may buffer incoming messages in a broker-side receive buffer 244. Broker 202 may generate an acknowledgment (ACK) HTTP packet to acknowledge the receipt of each HTTP packet successfully received from a client 200, and send the ACK packets to Web server 208 over a TCP connection 296 as indicated at 282A and 282B. Web server 208 may buffer the ACK packets received from broker 202 in buffers 250. In one embodiment, there may be a buffer 250 for each HTTP tunnel connection 292; in other words, each connection 292 may use a separate instance of buffer 250. In another embodiment, one buffer 250 may be shared among two or more HTTP tunnel connections 292.

Using the HTTP tunneling protocol layer, a broker 202 as well as clients 200 may initiate messaging system messages. Messages generated by broker 202 may be buffered in a broker-side transmit buffer 242. Buffering message data may allow messages to be retransmitted if necessary, for example. The broker 202 may generate HTTP packets that include the message data as payloads and transmit the HTTP packets to Web server 208 over a TCP connection 296 as indicated at 288A and 288B. Web server 208 may buffer the HTTP message packets received from broker 202 in buffers 250.

As indicated at 284A and 284B, each client 200 may send an HTTP request packet to Web server 208 to indicate that the client 200 is ready to receive HTTP packets buffered in a buffer 250 for the client 200. In one embodiment, each client may periodically send HTTP request packets to retrieve buffered HTTP packets from Web server 208. In one embodiment, a separate thread on a client 200 may be responsible for periodically sending the HTTP request packets.

After Web server 208 receives an HTTP request packet from a client 200 as indicated at 284, the Web server 208 may respond by sending the requesting client 200 one or more HTTP packets currently buffered in a buffer 250 for the client 200. The HTTP packets may include ACK packets as sent at 282 and/or HTTP message packets as sent at 288.

Upon receiving HTTP packets from the Web server 208, a client 200 may store the received packets in a client-side receive buffer 224 to await processing. A client 200 may also generate an ACK packet and send them to broker 202 over the HTTP tunnel connection, as indicated at 290A and 290B, in response to each HTTP message packet received.

FIG. 5B illustrates the process of sending a message from a client 200 to a broker 202 via an HTTP tunnel connection according to one embodiment. At 300, the client 200 may generate a message 260A. At 302, the client side HTTP tunneling driver 220 may receive the message 260A and buffer the outgoing message data in a transmit buffer 222, which may allow the message data to be retransmitted if necessary. The client side HTTP tunneling driver 220 generates an HTTP POST request with the message data as payload as indicated at 304. This HTTP request may travel over the Internet. The client 200 may be configured to send HTTP requests via a proxy server 206 and through one or more firewalls 210 if necessary.

A Web server 208 may receive the HTTP request with the message data, and forward the HTTP request to the server side HTTP tunneling driver 240 over a TCP connection as indicated at 306. The server side HTTP tunneling driver 240 may store the received message data in a receive buffer 244. The packet header of the HTTP request may include a sequence number for use in preserving message order when multiple messages are transmitted. The message data may remain in receive buffer 244 until the broker 202 consumes it.

The server side HTTP tunneling driver may generate an acknowledgement (ACK) HTTP packet to indicate successful receipt of the HTTP request packet and message data. The ACK packet may include information about how much space is left in the receive buffer 244. This information may be used as a "flow control" mechanism to slow down the sender (client) if the receiver (broker) cannot consume the data fast enough. The ACK packet may be sent to the Web server 208 over the TCP connection as indicated at 308. The ACK packet may be stored in packet buffer 250A on the Web server 208 waiting for an HTTP request from the client 200. In one embodiment, the Web server 208 may not initiate communication with the client 200; it can only respond to incoming HTTP requests.

The client side HTTP tunneling driver 220 then may send an HTTP request packet to the Web server 208 to pull any pending HTTP packets as indicated at 310. In one embodiment, the client side HTTP tunneling driver 220 may use a separate reader thread that continuously sends requests to the Web server 208 to pull any pending HTTP packets. After the Web server 208 receives a pull request for the HTTP packet buffered at 308, the Web server may send the buffered HTTP packet(s) to client 200 in response to the pull request as indicated at 312. The client side HTTP tunneling driver 220 then may process the HTTP packet(s) including the ACK packet, and free the corresponding message data buffered in transmit buffer 222 at 302. In one embodiment, information from the HTTP packet(s) sent to the client 200 may be stored in a client-side receive buffer (not shown) and accessed from the client-side receive buffer for processing.

FIG. 5C illustrates the process of sending a message from the broker 202 to the client 200 via an HTTP tunnel connection according to one embodiment. At 400, the broker 202 generates a message 260B. At 402, the broker side HTTP tunneling driver 240 may receive the message 260B and buffer the outgoing message data in a transmit buffer 242 so that it can be retransmitted if necessary. The broker side HTTP tunneling driver 240 may generate an HTTP packet with the message data as payload and forward it to Web server 208 over a TCP connection as indicated at 404. The Web server 208 receives the HTTP packet with the message data, and writes the packet to buffer 250. The server side HTTP tunneling driver 240 may send an HTTP request to the Web server 208 to pull any pending packets as indicated at 406. When the Web server 208 receives the pull request, it sends the packet buffered at 404 in response to the pull request as indicated at 408. The client side HTTP tunneling driver 220 may store the received message data in a receive buffer 224. The packet header of the HTTP request may include a sequence number to preserve message order. The message data may remain in receive buffer 224 until the client 200 consumes it.

The client side HTTP tunneling driver generates an acknowledgement (ACK) HTTP packet to indicate successful receipt of the HTTP request and message data. The ACK packet may also include information about how much space is left in receive buffer 224. This information may be used as a "flow control" mechanism to slow down the sender (broker) if the receiver (client) cannot consume the data fast enough. The ACK packet may be sent to the Web server 208 over the Internet as indicated at 410. Web server 208 may forward the ACK packet to the server side HTTP tunneling driver 240 over a TCP connection as indicated at 412. The server side HTTP tunneling driver 240 then may free the corresponding message data packet(s) buffered in transmit buffer 242 at 402. In one embodiment, information from the ACK packet sent to the broker 202 may be stored in a broker-side receive buffer (not shown) and accessed from the broker-side receive buffer for processing.

Figure 6A:
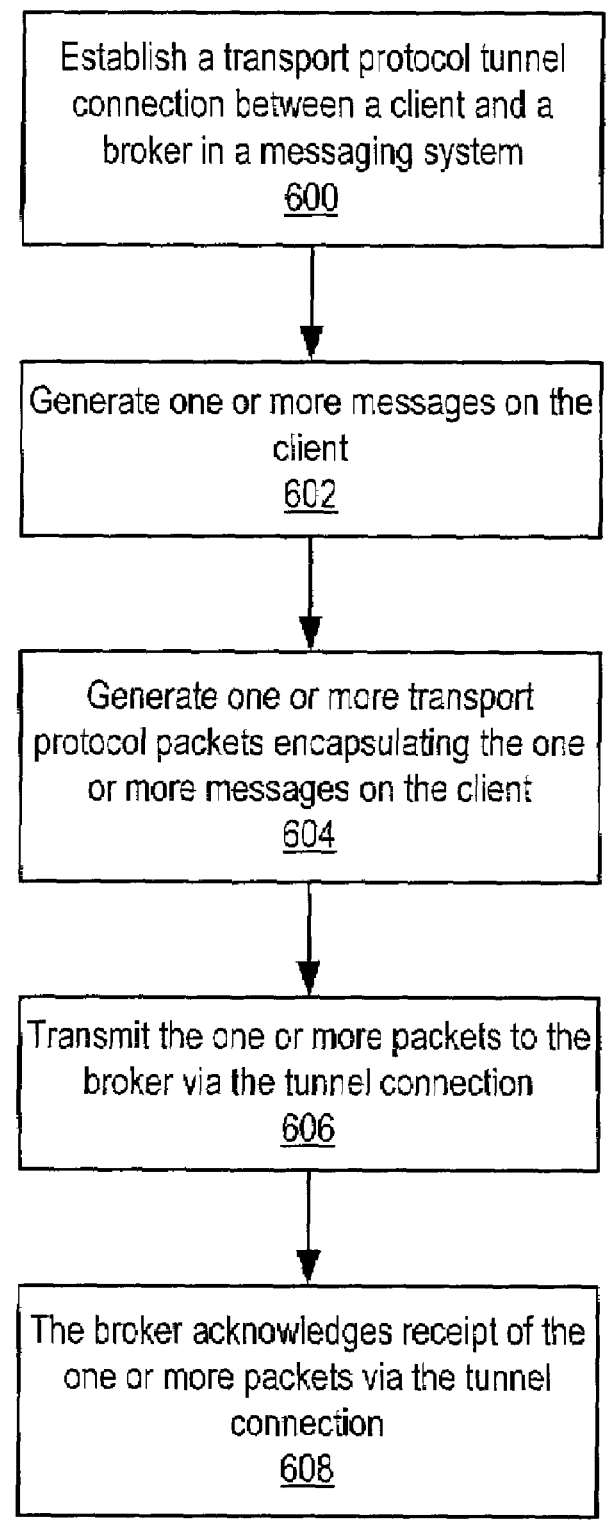
FIGS. 6A is a flowchart of a method for sending messages from a messaging system client to a messaging system broker over a transport protocol tunnel connection layer according to one embodiment.
Figure 6B:
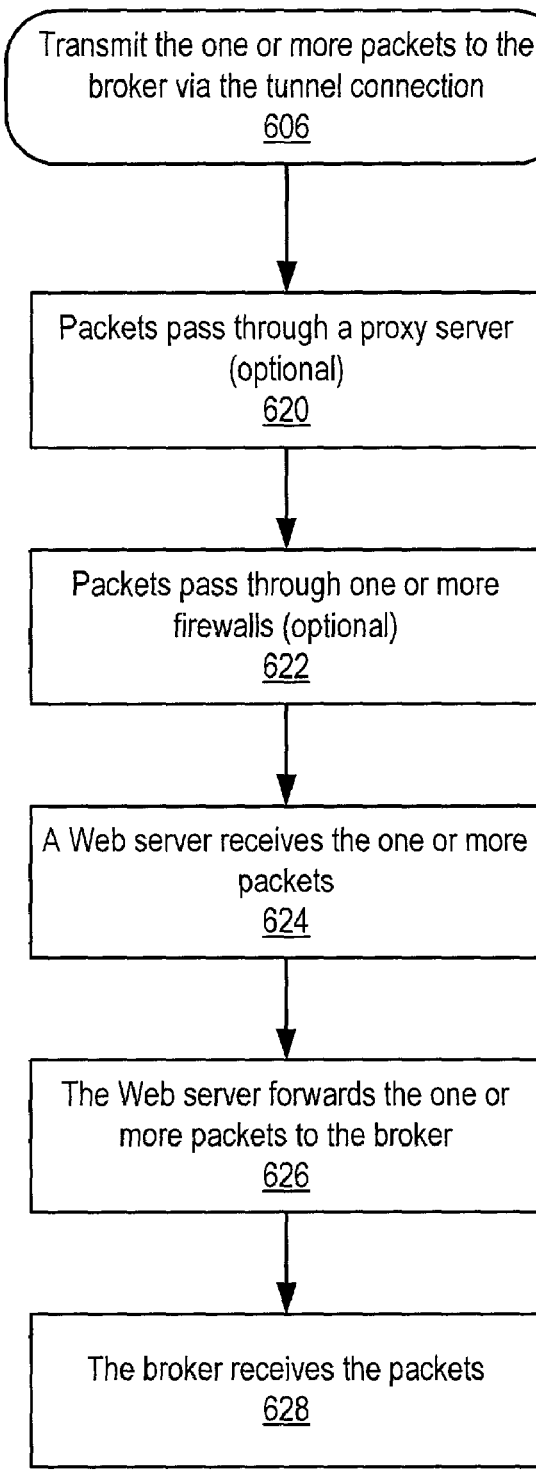
FIG. 6B is a flowchart of a method for transmitting one or more packets from a client to a broker via a transport protocol tunnel connection according to one embodiment.
Figure 6C:
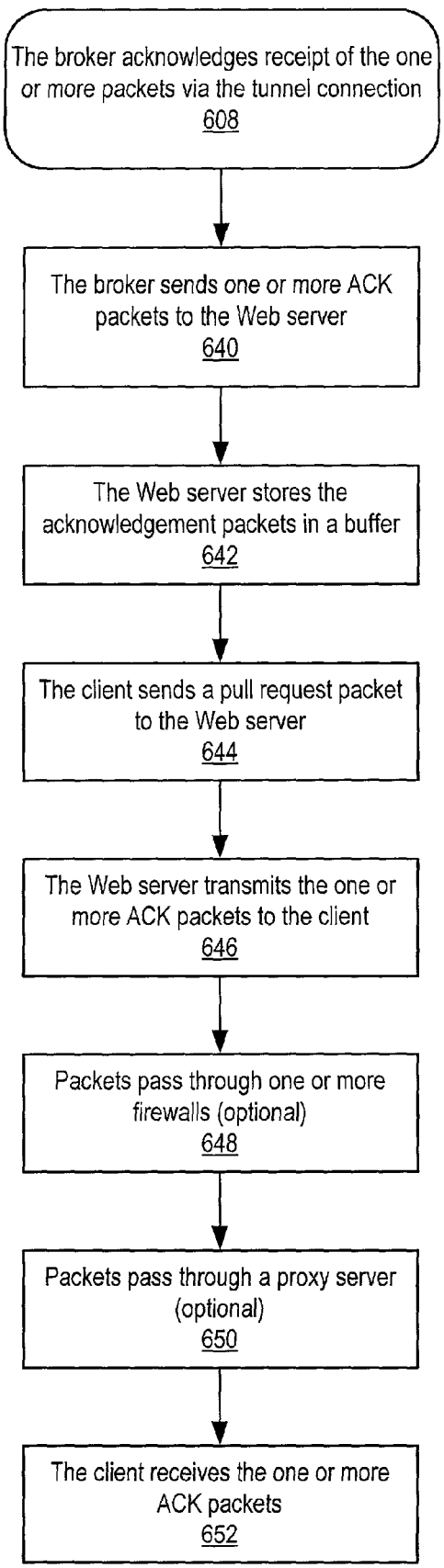
FIG. 6C is a flowchart of a method for a broker to acknowledge to a client the receipt of transport protocol packets via the transport protocol tunnel connection according to one embodiment.

FIGS. 6A–6C are flowcharts illustrating a method of sending messages from a messaging system client to a messaging system broker over an HTTP tunnel connection layer according to one embodiment. In FIG. 6A, a transport protocol tunnel connection between a client and a broker in a messaging system may be established as indicated at 600. As indicated at 602, one or more messaging system messages may be generated on the client. In one embodiment, the generated messages may then be stored in a client-side transmit buffer. One or more transport protocol packets encapsulating the one or more messages may be generated on the client as indicated at 604. In one embodiment, a client-side HTTP tunnel connection driver may generate the HTTP packets and include the messages as payloads of the packets. As indicated at 606, the one or more HTTP packets may then be transmitted to the broker via the HTTP tunnel connection. In one embodiment, the client-side HTTP tunnel connection driver may handle the transmission of the packets.

In one embodiment, each HTTP packet transmitted on the HTTP tunnel connection may include message sequence information configured for use by the receiver in processing received messages in the correct sequence. This is useful since HTTP and some other transport protocols do not guarantee delivery of messages in order. In one embodiment, flow control may be applied to the sending of messages from a sender to a receiver. In flow control, before sending new messages, the sender may determine available resources on the receiver to receive new messages, and then transmit no more messages than the receiver can handle based upon the available resources. In one embodiment, the receiver may inform the sender of available space in a receive buffer to store incoming messages awaiting processing. In one embodiment, upon establishment of an HTTP tunnel connection, each side (both clients and brokers can be senders and/or receivers) may inform the other of its receive buffer size.

As indicated at 608, the broker may receive the HTTP packets and then may acknowledge receipt of the one or more packets by sending one or more acknowledgement (ACK) packets to the client via the HTTP tunnel connection. In one embodiment, the ACK packets may each include the currently available space in the broker-side receive buffer. Thus, the sender (client) can keep track of the current receive capacity of the receiver (broker).

FIG. 6B expands on 606 of FIG. 6A and illustrates a method of transmitting one or more packets from a client to a broker via an HTTP tunnel connection according to one embodiment. As indicated at 620, the transmitted HTTP packets may optionally pass through a proxy server. As indicated at 622, the transmitted HTTP packets may optionally pass through one or more firewalls. A Web server may then receive the one or more HTTP packets as indicated at 624. For example, the client may transmit the packets to a proxy server, the proxy server may transmit the packets through a firewall onto the Internet, and the packets may be received through another firewall by the Web server.

The Web server may then forward the received HTTP packets to the broker as indicated at 626. In one embodiment, the packets may be transmitted to the broker via a TCP connection between the Web server and the broker that serves as one segment of the HTTP tunnel connection. In one embodiment, an HTTP tunnel servlet on the Web server node may serve as an interface between the Web server and the TCP connection to the broker. In one embodiment, one Web server and HTTP tunnel servlet may be used by two or more clients to communicate to a broker via HTTP tunnel connections. In this embodiment, the HTTP tunnel servlet may multiplex HTTP packets from the two or more clients onto the TCP connection. In one embodiment, the HTTP tunnel servlet may extract the messaging system message information from received HTTP packets and send only the message information to the broker over the TCP connection.

As indicated at 628, the broker may receive the HTTP packets from the Web server. In one embodiment, the broker may receive the packets on a TCP connection to the Web server. In one embodiment, a broker-side HTTP tunnel driver may receive the packets. In one embodiment, the broker may extract the messaging system messages from the HTTP packets and store the messages in a broker-side receive buffer. In another embodiment, the entire HTTP packet may be stored in a receive buffer. In one embodiment, there may be one receive buffer on the broker for each HTTP tunnel connection. In another embodiment, a single receive buffer may be used for two or more HTTP tunnel connections.

FIG. 6C expands on 608 of FIG. 6A and illustrates a method of a broker acknowledging to a client the receipt of HTTP packets from the client via the HTTP tunnel connection according to one embodiment. As indicated at 640, the broker may generate and send one or more acknowledgement (ACK) packets to the Web server. In one embodiment, the broker may store ACK packets in a broker-side transmit buffer. In one embodiment, the broker may send one ACK packet for each received HTTP packet. In another embodiment, the broker may send one ACK packet for each completely received messaging system message. In one embodiment, the ACK packets may be sent to the Web server over a TCP connection. In one embodiment, a broker-side HTTP tunnel driver may handle the transmission of the ACK packets on the TCP connection. In one embodiment, an HTTP tunnel servlet may receive the packets for the Web server.

As indicated at 642, the Web server may store the acknowledgement packets in an HTTP packet buffer. In one embodiment, there may be one HTTP packet buffer for each HTTP tunnel connection supported by the Web server. In another embodiment, there may be two HTTP packet buffers per tunnel connection, with one HTTP packet buffer for each message flow direction on each tunnel connection. In yet another embodiment, one or more HTTP packet buffers may be used for two or more tunnel connections.

As indicated at 644, at some point, the client may send an HTTP pull request packet to the Web server. In one embodiment, the client may periodically send HTTP pull requests to the Web server. In one embodiment, a separate thread on the client may handle periodically sending pull requests. The Web server may transmit to the client the one or more HTTP ACK packets stored in the HTTP packet buffer associated with the client in response to receiving the pull request packet as indicated at 646. As indicated at 648, the transmitted ACK packets may optionally pass through one or more firewalls. As indicated at 750, the transmitted ACK packets may optionally pass through a proxy server. As indicated at 652, the client may then receive the one or more ACK packets. In one embodiment, each ACK packet may include information on available space in the broker-side receive buffer to be used in flow control of HTTP packets from the client to the broker. The ACK packets may serve to acknowledge the receipt of the transmitted data so that the sender may free its transmit buffers.

Figure 7A:
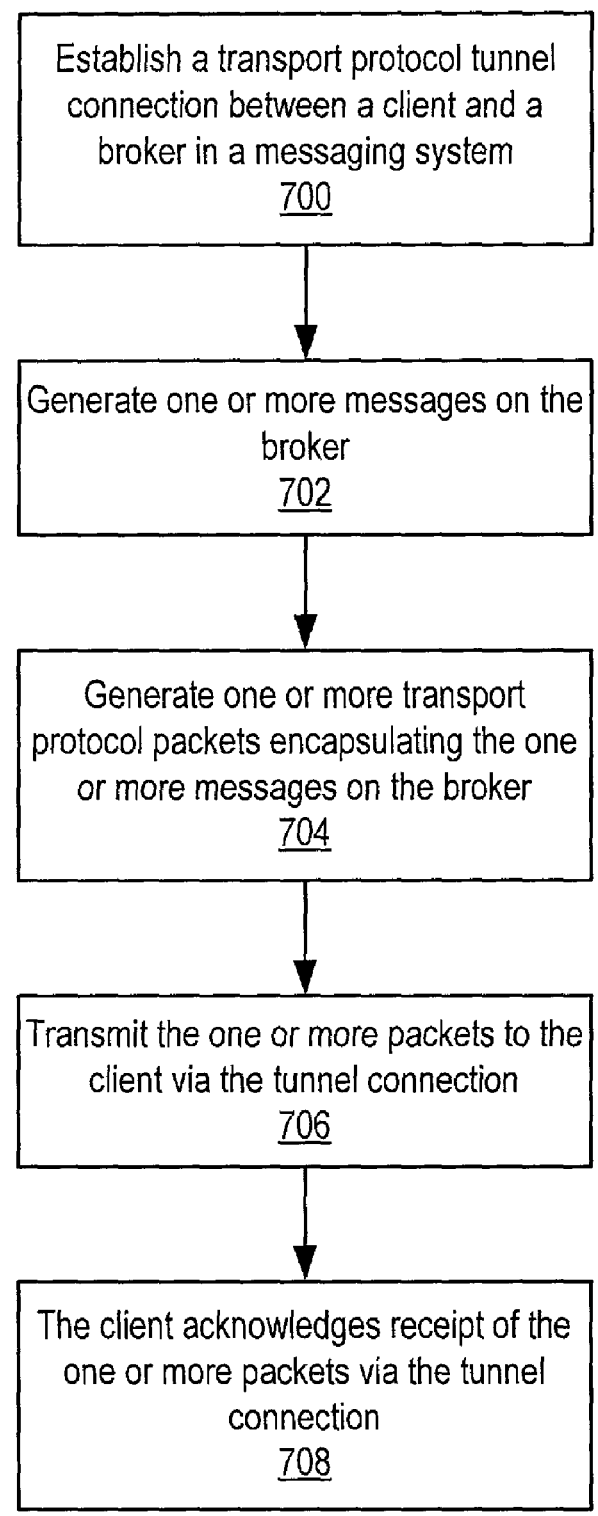
FIG. 7A is a flowchart of a method for sending messages from a messaging system client to a messaging system broker over a transport protocol tunnel connection layer according to one embodiment.
Figure 7B:
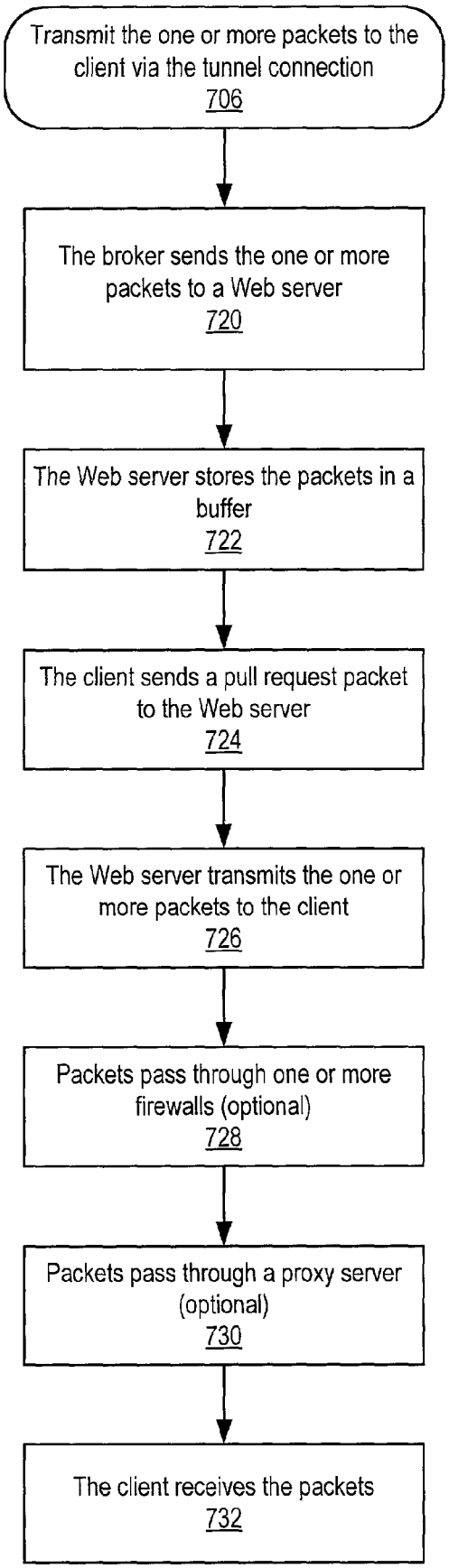
FIG. 7B is a flowchart of a method for transmitting one or more packets from a broker to a client via a transport protocol tunnel connection according to one embodiment.
Figure 7C:
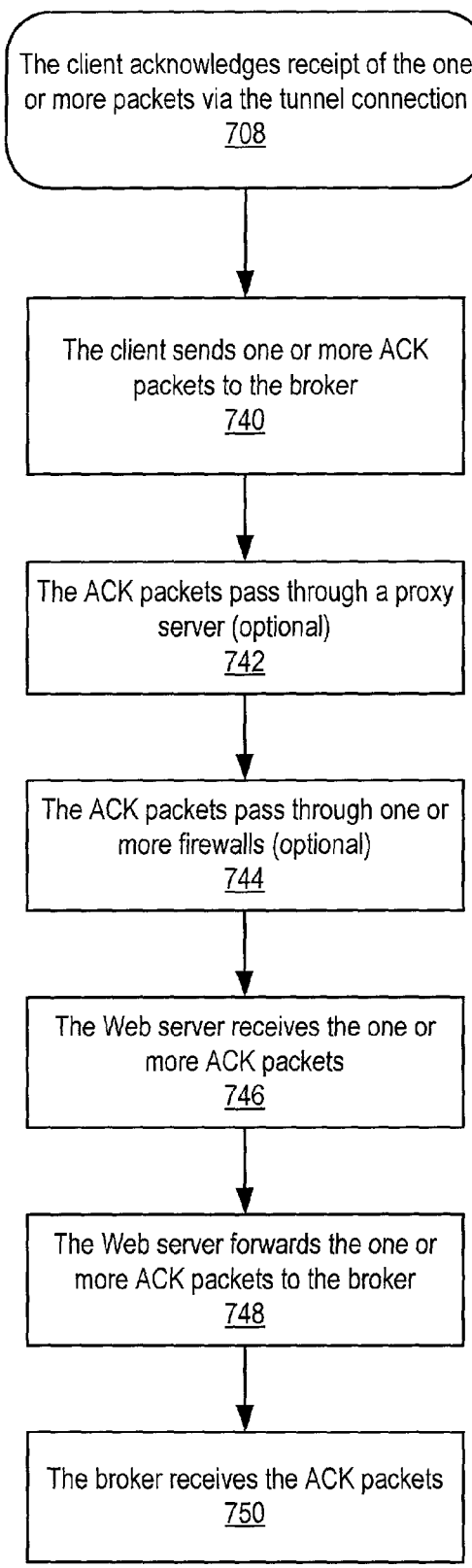
FIG. 7C is a flowchart of a method for a client to acknowledge to a broker the receipt of transport protocol packets via a transport protocol tunnel connection according to one embodiment.

FIGS. 7A–7C are flowcharts illustrating a method of sending messages from a messaging system client to a messaging system broker over an HTTP tunnel connection layer according to one embodiment. In FIG. 7A, a transport protocol tunnel connection between a client and a broker in a messaging system may be established as indicated at 700. As indicated at 702, one or more messaging system messages may be generated on the broker. In one embodiment, the generated messages may then be stored in a broker-side transmit buffer. One or more transport protocol packets encapsulating the one or more messages may be generated on the broker as indicated at 704. In one embodiment, a broker-side HTTP tunnel connection driver may generate the HTTP packets and include the messages as payloads of the packets. As indicated at 706, the one or more HTTP packets may then be transmitted to the client via the HTTP tunnel connection. In one embodiment, the broker-side HTTP tunnel connection driver may handle the transmission of the packets.

As indicated at 708, the client may receive the HTTP packets, and then may acknowledge receipt of the one or more packets by sending one or more acknowledgement (ACK) packets to the broker via the HTTP tunnel connection. In one embodiment, the ACK packets may each include the currently available space in the client-side receive buffer. Thus, the sender (broker) can keep track of the current receive capacity of the receiver (client).

FIG. 7B expands on 706 of FIG. 7A and illustrates a method of transmitting one or more packets from a broker to a client via an HTTP tunnel connection according to one embodiment. As indicated at 720, the broker may generate and send one or more HTTP packets to the Web server. In one embodiment, the broker may store the HTTP packets in a broker-side transmit buffer. In one embodiment, the HTTP packets may be sent to the Web server over a TCP connection. In one embodiment, a broker-side HTTP tunnel driver may handle the transmission of the HTTP packets on the TCP connection.

As indicated at 722, the Web server may receive the HTTP packets and store the received HTTP packets in an HTTP packet buffer. In one embodiment, an HTTP tunnel servlet may receive the packets for the Web server. As indicated at 724, at some point, the client may send an HTTP pull request packet to the Web server. In one embodiment, the client may periodically send HTTP pull requests to the Web server. The Web server may transmit to the client the one or more HTTP packets stored in the HTTP packet buffer associated with the client in response to receiving the pull request packet as indicated at 726. As indicated at 728, the transmitted HTTP packets may optionally pass through one or more firewalls. As indicated at 730, the transmitted HTTP packets may optionally pass through a proxy server. As indicated at 732, the client may then receive the one or more HTTP packets. In one embodiment, the client may store the received HTTP packets in a client-side receive buffer. In one embodiment, each HTTP packet may include sequence information configured for use by the client in processing received messages in sequence.

FIG. 7C expands on 708 of FIG. 7A and illustrates a method of a client acknowledging to a broker the receipt of HTTP packets from the broker via the HTTP tunnel connection according to one embodiment. As indicated at 740, the client may generate and send one or more acknowledgement (ACK) packets to the broker. As indicated at 742, the transmitted ACK packets may optionally pass through a proxy server. As indicated at 744, the transmitted ACK packets may optionally pass through one or more firewalls. A Web server may then receive the one or more ACK packets as indicated at 746. For example, the client may transmit the ACK packets to a proxy server, the proxy server may transmit the ACK packets through a firewall onto the Internet, and the ACK packets may be received through another firewall by the Web server.

The Web server may then forward the received ACK packets to the broker as indicated at 748. In one embodiment, the ACK packets may be transmitted to the broker via a TCP connection between the Web server and the broker that serves as one segment of the HTTP tunnel connection. In one embodiment, an HTTP tunnel servlet on the Web server node may serve as an interface between the Web server and the TCP connection to the broker.

As indicated at 750, the broker may receive the ACK packets from the Web server. In one embodiment, the broker may receive the packets on a TCP connection to the Web server. In one embodiment, a broker-side HTTP tunnel driver may receive the ACK packets. In one embodiment, the received ACK packets may be stored in a broker-side receive buffer. In one embodiment, each ACK packet may include information on available space in the client-side receive buffer to be used in flow control of HTTP packets from the broker to the client.

The methods as described in FIGS. 6A–6C and FIGS. 7A–7C may be implemented in software, hardware, or a combination thereof. The order of method may be changed, and various steps may be added, reordered, combined, omitted, modified, etc.

Figure 8:
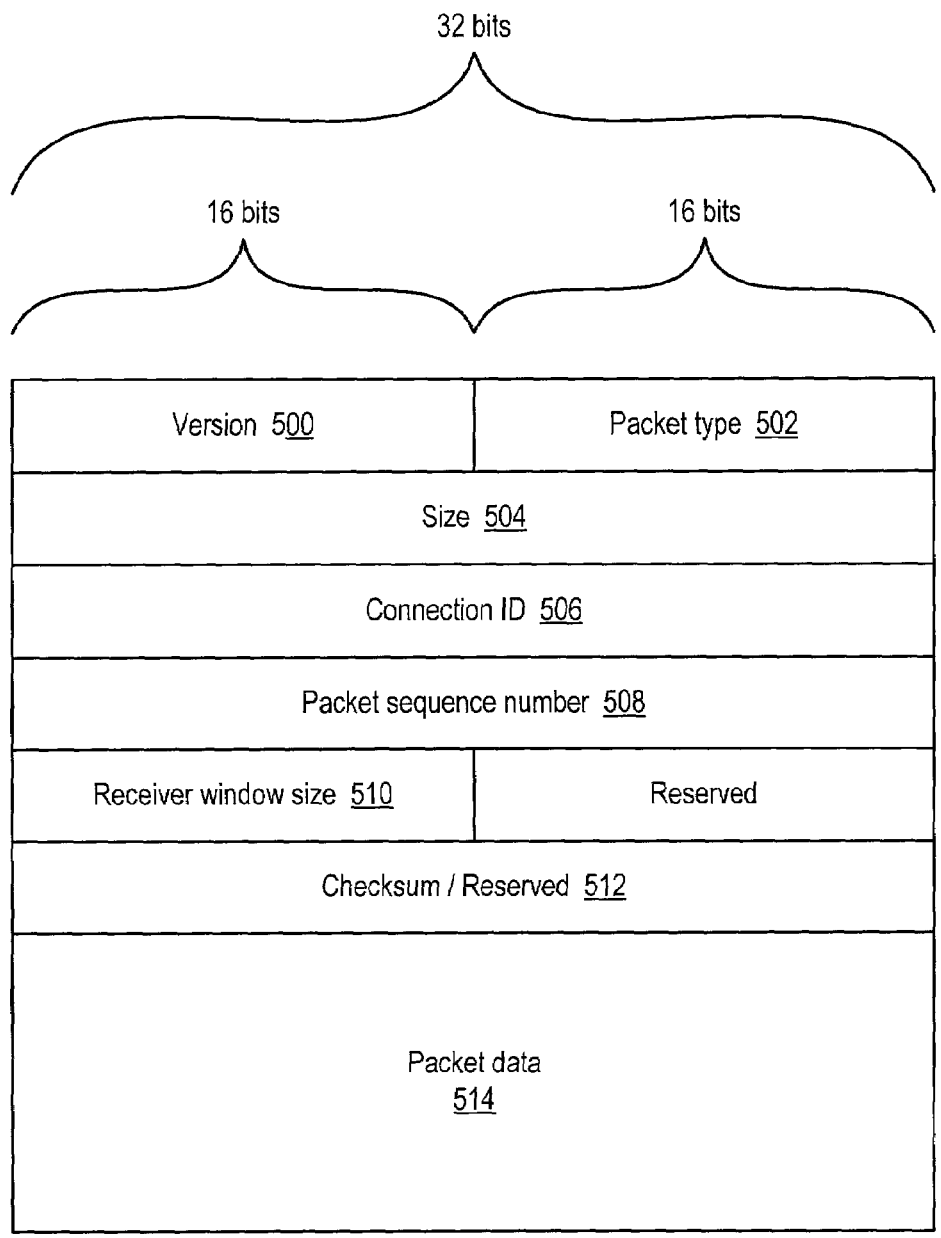
FIG. 8 illustrates an exemplary transport protocol packet format that may be used in the transport protocol tunnel connection layer according to one embodiment.

FIG. 8 illustrates an exemplary HTTP tunneling protocol packet format according to one embodiment. The HTTP tunnel drivers at either end of a connection may encode all their data packets using this packet format. Each messaging system message may be carried separately as a HTTP request or response payload. A messaging system message may be sent as the payload of a single packet or, alternatively, the message may be broken into parts and sent as the payload of two or more packets.

The packet format may include several fields. Version 500 may indicate a version number of the packet that may be used to indicate different releases of the HTTP tunnel connection layer software. In one embodiment, the version 500 may be a 16-bit field. Packet type 502 may indicate the type of the packet. This field may be used to indicate to the HTTP tunnel driver at the other end what to do with the contents of this packet. In one embodiment, the packet type field may be 16 bits. Size 504 may indicate the size of the entire packet including the header. In one embodiment, this may be a 32-bit field. Connection ID 506 may be a unique integer that may be used as connection identifier. This value may be assigned at the time of connection establishment. This field may be used by the server to distinguish between connections to multiple clients. In one embodiment, this may be a 32-bit field. Packet sequence number 508 may be used to ensure sequential delivery of data bytes and flow control. In one embodiment, each packet may be assigned a unique incremental sequence number by the sender. In one embodiment, this may be a 32-bit field. One embodiment may include a receiver window size 510 that may be used for flow control and may indicate the capacity of the receive side buffer. In one embodiment, this may be a 16-bit field. One embodiment may guarantee that the packets are either delivered correctly, or in case of an error, are not delivered at all. Some embodiments may not use checksum 512, and thus this field may be reserved.

One embodiment of the HTTP tunnel connection layer may use a connection establishment protocol that may be used to initialize the following connection state components:

The HTTP tunnel servlet 214 allocates a unique connection ID for the new connection. It also may allocate one or more buffers 250 for packet streams in both directions.

The HTTP tunnel drivers on both server and client side allocate and initialize the transmit buffers and receive buffers for packet streams in both directions.

The following are examples of HTTP tunneling protocol packets that may be used in the connection establishment protocol and are not intended to be limiting. Note that one skilled in the art will recognize that other packet formats may be used within the scope of the invention.

A client 200 may initiate a connection to a server 202 by sending the following information in an HTTP packet to the HTTP tunnel servlet 214:

URL parameters="?ServerName=<ServerIdString>&Type=connect"

Packet Type=connection initialization packet (e.g. CONN_INIT_PACKET (1)).

Connection ID=0

The servlet 214 may allocate a unique connection ID for this connection and send it to the client 200 and the server 202 in HTTP packets including the following information:

Packet Type=connection initialization packet (e.g. CONN_INIT_PACKET (1)).

ConnectionID=<connid>

This information may be sent to the client 200 as a response payload for the HTTP request that carried the client's connection initialization packet.

The server 202 may acknowledge the connection initialization packet to the client 200 in an ACK packet that may include the following information:

Pull URL parameters="?ServerName=<ServerIdString>&Type=pull&ConnId=<connid>"

Packet Type=connection initialization acknowledgement (e.g. CONN_INIT_ACK (2)).

After completion, both client 200 and server 202 are aware of the newly established connection and normal data exchange can begin.

Once the connection is established, both sides may start sending data and connection management packets. The following are examples of HTTP tunneling protocol packets that may be used as data and connection management packets and are not intended to be limiting. Note that one skilled in the art will recognize that other packet formats may be used within the scope of the invention.

From the client 200 to the HTTP tunnel servlet 214 to the server 202:

URL parameters="?ServerName=<ServerIdString>&Type=push"

From the server 202 to the HTTP tunnel servlet 214 to the client 200:

Pull URL parameters="?ServerName=<ServerIdString>&Type=pull&ConnId=<connid>"

Each outgoing data packet (e.g. Packet Type=DATA_PACKET) may be assigned an incremental sequence number by the sender. The receiver may check the packet sequence number with its receive window. Any duplicate packets may be discarded.

After consuming a packet, the receiver may acknowledge the highest contiguous sequence number by sending the ACK packet as follows:

Packet Type=acknowledgement (e.g. ACK)

Connection ID=<connid>

Sequence=<sequence number of the data packet being acknowledged>

Receive Window Size=<remaining receive window capacity>

When an acknowledgement is received, the sender may update the round trip time for the connection. In one embodiment, a simple linear function of the computed round trip time may be used as the packet retransmission interval.

In one embodiment, when an acknowledgement packet reports a "Receive Window Size" of zero, the sender may stop sending further packets. The sender may send periodic repeat transmissions of the next packet to force the receiver to send a window update as soon as it is ready to receive more data. When the receiver indicates that it is ready to receive more data, the sender may resume sending packets.

In one embodiment, the HTTP Tunneling protocol may support the following runtime connection option. The client pull period is the duration (e.g. in seconds) of the idle period between consecutive pull requests sent by the client. If this value is positive, whenever the HTTP tunnel driver on the client side receives an empty response to its Pull request, the driver may sleep for the specified period before issuing another pull request. This may help conserve the servlet 214's resources and hence improve connection scalability.

Either client 200 or server 202 may set connection options. This may be used to control the runtime parameters associated with a connection. For example, this may be used to control how often packets are pulled from a Web server. As another example, this may be used to configure how long a client may remain inactive before the connection is dropped. The connection option values are part of the connection state information, and hence, in one embodiment, an HTTP packet including the following information may be used to update the connection options:

Packet Type=connection option packet (e.g. CONN_OPTION_PACKET)

$$\text{Data} = \begin{array}{l} \text{Option Type (integer)} \\ \text{Option Value (integer)} \end{array}$$

In one embodiment, either end (client or server) may initiate connection shutdown by sending a connection close packet (e.g. Packet Type CONN_CLOSE_PACKET). Until both parties complete the connection shutdown, this packet may otherwise be treated like a normal data packet. This may help to ensure that all the data packets that are in the pipeline ahead of the connection close packet are processed before the connection resources are destroyed. The remote end may consume all the data and acknowledge the connection close packet, at which point the connection is terminated and all the resources may be freed.

In one embodiment, a connection abort packet may be generated by the servlet when it realizes that either the server 202 or the client 200 has terminated ungracefully. The server termination may result in an IOException on the TCP connection between the servlet 214 and the server 202, and hence may be detected. In one embodiment, detecting client 200 termination may be handled as follows. If the servlet 214 does not receive a "pull" request from client 200 for a certain period of time, the servlet 214 may assume that the client 200 is not responding and thus may be down. The ungraceful connection shutdown may be achieved by sending a single packet with Packet Type connection abort packet (e.g. CONN_ABORT_PACKET) to the server 202 and possibly to the client 200 as well.

The following describes the initialization of the link between server 200 and HTTP tunneling servlet 214 according to one embodiment. The HTTP tunneling servlet 214 may listen on a fixed port number for TCP connections from servers. After the TCP connection is established to server 200, the server 200 may send the following information in an HTTP tunneling protocol packet to the servlet 214:

Packet Type: link initialization packet (e.g. LINK_INIT_PACKET)

$$\text{Data} = \begin{array}{l} \textit{ServerIdString} \text{ (String)} \\ \textit{ConnectionCount} \text{ (Integer)} \\ \text{Sequence of } \{\textit{ConnectionID} \text{ (integer)}, \\ \textit{ConnectionPullPeriod} \text{ (integer)}\} \end{array}$$

The ServerIdString may be used to establish the identity of the server 200. Clients may use this string to specify which server they want to talk to. This allows the use of a single servlet 214 as a gateway for multiple servers. The data portion of this packet may include information about any existing HTTP Tunnel connections. This allows HTTP tunnel connections to survive unexpected Web server/servlet engine failures or restarts.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing HTTP tunnel connections between entities such as clients and servers in a messaging system have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
    establishing a transport protocol tunnel connection from a first node in a messaging system to a second node in the messaging system, wherein the second node is a messaging server configured to receive messages from a plurality of clients and deliver the messages to specified ones of a plurality of recipients according to a standard messaging API (application programming interface);
    generating a messaging system message on the first node according to the standard messaging API of the messaging sever;
    generating one or more transport protocol packets, wherein the one or more transport protocol packets each includes at least a part of the messaging system message; and
    transmitting the one or more transport protocol packets to the second node via the transport protocol tunnel connection;
    wherein the transport protocol tunnel connection provides full-duplex transmission of messaging system messages between the first node and the second node, and wherein the transport protocol tunnel connection further provides delivery of the messaging system messages in the sequence in which the messaging system messages are generated;
    the second node generating an acknowledgement transport protocol packet to indicate successful receipt of the one or more transport protocol packets including the messaging system message;
    wherein the acknowledgement transport protocol packet includes information indicating available space in a receive buffer on the second node, and wherein the information indicating available space in the receive buffer is configured for use in flow control of messaging system messages transmitted from the first node to the second node.

2. The method as recited in claim 1, further comprising storing the messaging system message in a transmit buffer on the first node after said generating the messaging system message on the first node.

3. The method as recited in claim 1, wherein the transport protocol tunnel connection passes through a proxy server.

4. The method as recited in claim 3, wherein said transmitting the one or more transport protocol packets to the second node via the transport protocol tunnel connection comprises:
    transmitting the one or more transport protocol packets from the first node to the proxy server; and
    transmitting the one or more transport protocol packets from the proxy server to the second node.

5. The method as recited in claim 1, wherein the transport protocol tunnel connection passes through at least one firewall.

6. The method as recited in claim 1, wherein the transport protocol tunnel connection is established through a network.

7. The method as recited in claim 6, wherein the network is the Internet.

8. The method as recited in claim 1, wherein the first node is a client in the messaging system, and wherein the second node is a broker in the messaging system.

9. The method as recited in claim 1, wherein the transport protocol tunnel connection passes through a third node, and wherein, in said transmitting the one or more transport protocol packets to the second node, the method further comprises:
    transmitting the one or more transport protocol packets to the third node; and
    the third node forwarding the one or more transport protocol packets to the second node.

10. The method as recited in claim 9, wherein the one or more transport protocol packets are forwarded to the second node via a Transmission Control Protocol (TCP) connection portion of the transport protocol tunnel connection between the third node and the second node.

11. The method as recited in claim 9, wherein the third node is a Web server.

12. The method as recited in claim 1, wherein the transport protocol tunnel connection passes through a proxy server arid a Web server, and wherein said transmitting the one or more transport protocol packets to the second node via the transport protocol tunnel connection comprises:
    transmitting the one or more transport protocol packets from the first node to the proxy server;
    transmitting the one or more transport protocol packets from the proxy server to the Web server; and
    the Web server forwarding the one or more transport protocol packets to the second node.

13. The method as recited in claim 12, wherein the transport protocol tunnel connection passes through at least one firewall between the proxy server and the Web server.

14. The method as recited in claim 1, wherein the one or more transport protocol packets include messaging system message sequence information configured for use in processing two or more messaging system messages in sequence.

15. The method as recited in claim 1, further comprising:
    receiving the transmitted one or more transport protocol packets on the second node; and
    storing the messaging system message from the one or more transport protocol packets in a receive buffer on the second node.

16. The method as recited in claim 1, further comprising:
    receiving the transmitted one or more transport protocol packets on the second node; and
    transmitting the acknowledgement transport protocol packet to the first node via the transport protocol tunnel connection.

17. The method as recited in claim 16, further comprising:
    storing the messaging system message from the received one or more transport protocol packets in a receive buffer on the second node.

18. The method as recited in claim 17, further comprising:
    receiving the transmitted acknowledgement transport protocol packet on the first node;
    generating one or more messaging system messages on the first node;

storing the one or more messaging system messages in a transmit buffer on the first node;

determining from the information indicating available space in the receive buffer included in the received acknowledgement transport protocol packet if there is space available to receive the one or more messaging system messages on the second node;

if said determining indicates there is space available to store the one or more messaging system messages in the receive buffer of the second node:

generating a second one or more transport protocol packets, wherein the second one or more transport protocol packets include the one or more messaging system messages; and transmitting the second one or more transport protocol packets to the second node via the transport protocol tunnel connection; and if said determining indicates there is not space available to store the second messaging system message in the receive buffer of the second node, inhibiting generating the second one or more transport protocol packets including the one or more messaging system messages.

19. The method as recited in claim 18, further comprising:

the first node receiving a transport protocol packet indicating available space in the receive buffer of the second node;

determining from the information indicating available space in the receive buffer included in the received transport protocol packet that there is space available to receive the one or more messaging system messages on the second node;

generating the second one or more transport protocol packets, wherein the second one or more transport protocol packets include the one or more messaging system messages; and transmitting the second one or more transport protocol packets to the second node via the transport protocol tunnel connection.

20. The method as recited in claim 16, wherein the transport protocol tunnel connection passes through a third node, and wherein, in said transmitting the acknowledgement transport protocol packet to the first node, the method further comprises:

transmitting the acknowledgement transport protocol packet to the third node; and storing the acknowledgement transport protocol packet in a transport protocol packet buffer on the third node.

21. The method as recited in claim 20, wherein, in said transmitting the acknowledgement transport protocol packet to the first node, the method further comprises:

the first node transmitting a transport protocol request packet to the third node; and the third node transmitting the acknowledgement transport protocol packet stored in the transport protocol packet buffer to the first node via the transport protocol tunnel connection in response to the transport protocol request packet.

22. The method as recited in claim 21, wherein the acknowledgement transport protocol packet is transmitted to the third node via a Transmission Control Protocol (TCP) connection portion of the transport protocol tunnel connection.

23. The method as recited in claim 16, wherein the transport protocol tunnel connection passes through a third node, and wherein, in said transmitting the acknowledgement transport protocol packet to the first node, the method further comprises:

transmitting the acknowledgement transport protocol packet to the third node; and the third node forwarding the acknowledgement transport protocol packet to the first node.

24. The method as recited in claim 23, wherein the acknowledgement transport protocol packet are forwarded to the first node via a Transmission Control Protocol (TCP) connection portion of the transport protocol tunnel connection.

25. The method as recited in claim 1, wherein the transport protocol tunnel connection passes through a third node, and wherein, in said transmitting the one or more transport protocol packets to the second node via the transport protocol tunnel connection, the method further comprises:

transmitting the one or more transport protocol packets to the third node; and storing the one or more transport protocol packets in a transport protocol packet buffer on the third node.

26. The method as recited in claim 25, wherein, in said transmitting the one or more transport protocol packets to the second node via the transport protocol tunnel connection, the method further comprises:

the second node sending one or more transport protocol request packets to the third node; and the third node transmitting the one or more transport protocol packets stored in the transport protocol packet buffer to the second node via the transport protocol tunnel connection in response to the one or more transport protocol request packets.

27. The method as recited in claim 25, wherein the third node is a Web server.

28. The method as recited in claim 1, wherein the transport protocol is Hypertext Transport Protocol (HTTP).

29. The method as recited in claim 1, wherein the transport protocol is one of UDP (User Datagram Protocol), IrDA (Infrared Data Association), SNA (Systems Network Architecture), IPX (Internetwork Packet eXchange), and Bluetooth.

30. A method, comprising:

establishing a Hypertext Transport Protocol (HTTP) tunnel connection from a first node in a messaging system to a second node in the messaging system, wherein the second node is a messaging server configured to receive messages from a plurality of clients and deliver the messages to specified ones of a plurality of recipients according to a standard messaging API (application programming interface);

generating a messaging system message on the first node according to the standard messaging API of the messaging sever;

generating one or more HTTP packets, wherein the one or more HTTP packets each includes at least a part of the messaging system message;

transmitting the one or more HTTP packets to the second node via the HTTP tunnel connection;

wherein the HTTP tunnel connection provides full-duplex transmission of messaging system messages between the first node and the second node, and wherein the HTTP tunnel connection further provides delivery of the messaging system messages in the sequence in which the messaging system messages are generated;

the second node generating an acknowledgement HTTP packet to indicate successful receipt of the one or more HTTP packets including the messaging system message, wherein the acknowledgement HTTP packet includes information indicating available space in the receive buffer.

31. The method as recited in claim 30, wherein the first node is a client in the messaging system, wherein the HTTP tunnel connection passes through a proxy server, and wherein said transmitting the one or more HTTP packets to the second node via the HTTP tunnel connection comprises:
   transmitting the one or more HTTP packets from the client to the proxy server; and
   transmitting the one or more HTTP packets from the proxy server to the second node.

32. The method as recited in claim 30, wherein the HTTP tunnel connection is established through the Internet, and wherein the HTTP tunnel connection passes through at least one firewall.

33. The method as recited in claim 30, wherein the first node is a client in the messaging system, and wherein the second node is a broker in the messaging system.

34. The method as recited in claim 30, wherein the HTTP tunnel connection passes through a Web server, wherein the second node is a broker in the messaging system, and wherein, in said transmitting the one or more HTTP packets to the second node, the method further comprises:
   transmitting the one or more HTTP packets to the Web server; and
   the Web server forwarding the one or more HTTP packets to the broker via a Transmission Control Protocol (TCP) connection portion of the HTTP tunnel connection between the Web server and the broker.

35. The method as recited in claim 30, wherein the first node is a client in the messaging system, wherein the second node is a broker in the messaging system, wherein the HTTP tunnel connection passes through a proxy server and a Web server, and wherein said transmitting the one or more HTTP packets to the broker via the HTTP tunnel connection comprises:
   transmitting the one or more HTTP packets from the client to the proxy server;
   transmitting the one or more HTTP packets from the proxy server to the Web server; and
   the Web server forwarding the one or more HTTP packets to the broker;
   wherein the HTTP tunnel connection passes through at least one firewall between the proxy server and the Web server.

36. The method as recited in claim 30, wherein the one or more HTTP packets include messaging system message sequence information configured for use in processing two or more messaging system messages in sequence.

37. The method as recited in claim 30, further comprising:
   receiving the transmitted one or more HTTP packets on the second node;
   storing the messaging system message from the one or more HTTP packets in a receive buffer on the second node;
   transmitting the acknowledgement HTTP packet to the first node via the HTTP tunnel connection.

38. The method as recited in claim 37, the method further comprising:
   receiving the transmitted acknowledgement HTTP packet on the first node;
   generating one or more messaging system messages on the first node;
   storing the one or more messaging system messages in a transmit buffer on the first node;
   determining from the information indicating available space in the receive buffer included in the received acknowledgement HTTP packet that there is not space available to receive the one or more messaging system messages on the second node;
   the first node receiving an HTTP packet from the second node indicating available space in the receive buffer of the second node;
   determining from the information indicating available space in the receive buffer included in the received HTTP packet that there is space available to receive the one or more messaging system messages on the second node;
   generating a second one or more HTTP packets, wherein the second one or more HTTP packets include the one or more messaging system messages; and
   transmitting the second one or more HTTP packets to the second node via the HTTP tunnel connection.

39. The method as recited in claim 37, wherein the first node is a client in the messaging system, wherein the HTTP tunnel connection passes through a Web server, and wherein, in said transmitting the acknowledgement HTTP packet to the first node, the method further comprises:
   transmitting the acknowledgement HTTP packet to the Web server;
   storing the acknowledgement HTTP packet in an HTTP packet buffer on the Web server;
   the client sending an HTTP request packet to the Web server; and
   the Web server transmitting the acknowledgement HTTP packet stored in the HTTP packet buffer to the client via the HTTP tunnel connection in response to the HTTP request packet.

40. A method comprising:
   establishing a transport protocol tunnel connection from a first node in a messaging system to a second node in the messaging system;
   generating a sequence of messaging system messages on the first node;
   generating a plurality of transport protocol packets on the first node, wherein each of the transport protocol packets includes at least a part of one of the sequence of messaging system messages, and wherein each of the transport protocol packets includes sequence information for the particular messaging system message;
   transmitting the plurality of transport protocol packets to the second node in the messaging system via the transport protocol tunnel connection;
   receiving the plurality of transport protocol packets on the second node;
   processing the sequence of messaging system messages on the second node, wherein said processing uses the sequence information for the plurality of messaging system messages in the plurality of transport protocol packets;
   the second node generating an acknowledgement transport protocol packet for each of the received transport protocol packets to indicate successful receipt of the transport protocol packets including the sequence of messaging system messages; and
   wherein each of the acknowledgement transport protocol packets includes information indicating available space in the receive buffer, wherein the information indicating available space in the receive buffer is configured for use in flow control of messaging system messages transmitted from the first node to the second node.

41. The method as recited in claim 40, wherein the transport protocol tunnel connection is established through the Internet, and wherein the transport protocol tunnel connection passes through at least one firewall.

42. The method as recited in claim 40, wherein the first node is a client in the messaging system, wherein the second node is a broker in the messaging system.

43. The method as recited in claim 40, wherein the second node is a broker in the messaging system, wherein the transport protocol tunnel connection passes through a Web server, and wherein said transmitting the plurality of transport protocol packets to the second node in the messaging system via the transport protocol tunnel connection comprises:
   transmitting the plurality of transport protocol packets from the first node to the Web server; and
   the Web server forwarding the plurality of transport protocol packets to the broker;
   wherein the transport protocol tunnel connection passes through at least one firewall between the proxy server and the Web server.

44. The method as recited in claim 40, wherein the first node is a broker in the messaging system, wherein the second node is a client in the messaging system.

45. The method as recited in claim 40, wherein the second node is a client in the messaging system, wherein the transport protocol tunnel connection passes through a Web server, and wherein, in said transmitting the plurality of transport protocol packets to the second node in the messaging system via the transport protocol tunnel connection comprises:
   transmitting the plurality of transport protocol packets to the Web server, storing the plurality of transport protocol packets in a transport protocol packet buffer on the Web server;
   the client sending one or more transport protocol request packets to the Web server; and
   the Web server transmitting the plurality of transport protocol packets stored in the transport protocol packet buffer to the client via the transport protocol tunnel connection in response to the one or more transport protocol request packets.

46. The method as recited in claim 40, further comprising:
   storing the sequence of messaging system messages from the received transport protocol packets in a receive buffer on the second node;
   transmitting the acknowledgement transport protocol packets to the first node via the transport protocol tunnel connection.

47. The method as recited in claim 40, wherein the transport protocol is Hypertext Transport Protocol (HTTP).

48. A method, comprising:
   establishing a transport protocol tunnel connection from a first node in a messaging system to a second node in the messaging system;
   the first node receiving a first transport protocol packet from the second node indicating available space in a receive buffer of the second node;
   generating one or more messaging system messages on the first node;
   storing the one or more messaging system messages in a transmit buffer on the first node;
   determining from the information indicating available space in the receive buffer included in the received first transport protocol packet that there is not space available to receive the one or more messaging system messages on the second node;
   the first node receiving a second transport protocol packet from the second node indicating available space in the receive buffer of the second node;
   determining from the information indicating available space in the receive buffer included in the received second transport protocol packet that there is space available to receive the one or more messaging system messages on the second node;
   generating one or more transport protocol packets, wherein the one or more transport protocol packets include the generated one or more messaging system messages; and
   transmitting the one or more transport protocol packets to the second node via the transport protocol tunnel connection.

49. The method as recited in claim 48, wherein the transport protocol tunnel connection is established through the Internet, and wherein the transport protocol tunnel connection passes through at least one firewall.

50. The method as recited in claim 48, wherein the first node is a client in the messaging system, wherein the second node is a broker in the messaging system.

51. The method as recited in claim 48, wherein the first node is a broker in the messaging system, wherein the second node is a client in the messaging system.

52. The method as recited in claim 48, further comprising:
   receiving the one or more transport protocol packets on the second node;
   storing the one or more messaging system messages from the received one or more transport protocol packets in the receive buffer on the second node;
   the second node generating one or more acknowledgement transport protocol packets to indicate successful receipt of the one or more transport protocol packets including the one or more of messaging system messages; and
   transmitting the one or more acknowledgement transport protocol packets to the first node via the transport protocol tunnel connection;
   wherein each of the acknowledgement transport protocol packets includes information indicating available space in the receive buffer.

53. The method as recited in claim 48, wherein the one or more transport protocol packets include messaging system message sequence information configured for use in processing two or more messaging system messages in sequence.

54. The method as recited in claim 48, wherein the transport protocol is Hypertext Transport Protocol (HTTP).

55. A messaging system, comprising:
   a first node comprising a first memory;
   a second node comprising a second memory, wherein the second node is a messaging server configured to receive messages from a plurality of clients and deliver the messages to specified ones of a plurality of recipients according to a standard messaging API (application programming interface);
   wherein the first memory comprises first program instructions executable within the first node to:
      establish a transport protocol tunnel connection from the first node to the second node through a network;
      generate a messaging system message according to the standard messaging API of the messaging sever;
      generate one or more transport protocol packets, wherein the one or more transport protocol packets each includes at least a part of the messaging system message; and
      transmit the one or more transport protocol packets to the second node via the transport protocol tunnel connection;

wherein the transport protocol tunnel connection provides full-duplex transmission of messaging system messages between the first node and, the second node, and wherein the transport protocol tunnel connection further provides delivery of the messaging system messages in the sequence in which the messaging system messages are generated;

wherein the second memory comprises second program instructions executable within the second node to:

generate an acknowledgement transport protocol packer to indicate successful receipt of the one or more transport protocol packets including the messaging system message, wherein the acknowledgement transport protocol packet includes information indicating available space in a receive buffer of the second node.

56. The messaging system as recited in claim 55, wherein the first node further comprises a transmit buffer, wherein the first program instructions are further executable within the first node to store the messaging system message in the transmit buffer on the first node after said generating the messaging system message.

57. The messaging system as recited in claim 55, wherein the transport protocol tunnel connection passes through a proxy server, and wherein, in said transmitting the one or more transport protocol packets to the second node via the transport protocol tunnel connection, the first program instructions are further executable within the first node to transmit the one or more transport protocol packets from the first node to the proxy server, wherein the proxy server is configured to transmit the one or more transport protocol packets to the second node.

58. The messaging system as recited in claim 55, wherein the transport protocol tunnel connection passes through at least one firewall.

59. The messaging system as recited in claim 55, wherein the transport protocol tunnel connection is established through the Internet.

60. The messaging system as recited in claim 55, wherein the first node is a client in the messaging system, and wherein the second node is a broker in the messaging system.

61. The messaging system as recited in claim 55, wherein the messaging system further comprises:

a third node comprising a third memory;

wherein the transport protocol tunnel connection passes through the third node, and wherein, in said transmitting the one or more transport protocol packets to the second node, the first program instructions are further executable within the first node to:

transmit the one or more transport protocol packets to the third node;

wherein the third memory comprises third program instructions executable within the third node to:

receive the one or more transport protocol packets from the first node; and forward the one or more received transport protocol packets to the second node.

62. The messaging system as recited in claim 61, wherein the one or more transport protocol packets are forwarded from the third node to the second node via a Transmission Control Protocol (TCP) connection portion of the transport protocol tunnel connection between the third node and the second node.

63. The messaging system as recited in claim 62, wherein the transport protocol tunnel connection passes through at least one firewall between the first node and the third node.

64. The messaging system as recited in claim 55, wherein the one or more transport protocol packets include messaging system message sequence information configured for use in processing two or more messaging system messages in sequence.

65. The messaging system as recited in claim 55, wherein the second memory comprises second program instructions executable within the second node to:

receive the transmitted one or more transport protocol packets;

transmit the acknowledgement transport protocol packet to the first node via the transport protocol tunnel connection.

66. The messaging system as recited in claim 65, wherein the second program instructions are further executable within the second node to:

store the messaging system message from the received one or more transport protocol packets in the receive buffer of the second node.

67. The messaging system as recited in claim 66, wherein the first node further comprises a transmit buffer, wherein the first program instructions are further executable within the first node to:

receive the transmitted acknowledgement transport protocol packet;

generate one or more messaging system messages;

store the one or more messaging system messages in the transmit buffer on the first node;

from the information indicating available space in the receive buffer included in the received acknowledgement transport protocol packet, determine if there is space available to receive the one or more messaging system messages on the second node;

if said determining indicates there is space available to store the one or more messaging system messages in the receive buffer of the second node:

generate a second one or more transport protocol packets, wherein the second one or more transport protocol packets include the one or more messaging system messages; and transmit the second one or more transport protocol packets to the second node via the transport protocol tunnel connection; and if said determining indicates there is not space available to store the second messaging system message in the receive buffer of the second node, inhibit generating the second one or more transport protocol packets including the one or more messaging system messages.

68. The messaging system as recited in claim 67, wherein the first program instructions are further executable within the first node to:

receive a transport protocol packet indicating available space in the receive buffer of the second node;

from the information indicating available space in the receive buffer included in the received transport protocol packet, determine that there is space available to receive the one or more messaging system messages on the second node;

generate the second one or more transport protocol packets, wherein the second one or more transport protocol packets include the one or more messaging system messages; and transmit the second one or more transport protocol packets to the second node via the transport protocol tunnel connection.

69. The messaging system as recited in claim 65, further comprising:
a third node comprising:
a third memory; and
a transport protocol packet buffer;
wherein the transport protocol tunnel connection passes through the third node, wherein the third memory comprises third program instructions executable within the third node to:
receive the acknowledgement transport protocol packet transmitted to the first node via the transport protocol tunnel connection from the second node; and
store the received acknowledgement transport protocol packet in the transport protocol packet buffer.

70. The messaging system as recited in claim 69, wherein the first program instructions are further executable within the first node to:
transmit a transport protocol request packet to the third node; and
wherein the third program instructions are further executable within the third node to:
receive the transport protocol request packet from the first node; and
transmit the acknowledgement transport protocol packet stored in the transport protocol packet buffer to the first node via the transport protocol tunnel connection in response to the received transport protocol request packet.

71. The messaging system as recited in claim 65, further comprising:
a third node comprising a third memory, wherein the transport protocol tunnel connection passes through the third node, wherein the third memory comprises third program instructions executable within the third node to:
receive the acknowledgement transport protocol packet transmitted to the first node via the transport protocol tunnel connection from the second node; and
forward the acknowledgement transport protocol packet to the first node.

72. The messaging system as recited in claim 55, further comprising:
a third node comprising:
a third memory; and
a transport protocol packet buffer;
wherein the transport protocol tunnel connection passes through the third node, wherein the third memory comprises third program instructions executable within the third node to:
receive the one or more transport protocol packets transmitted to the second node via the transport protocol tunnel connection from the first node; and
store the one or more transport protocol packets in the transport protocol packet buffer on the third node,
wherein the second program instructions are further executable within the second node to transmit one or more transport protocol request packets to the third node; and
wherein the third program instructions are further executable within the third node to:
receive the one or more transmitted transport protocol request packets; and
transmit the one or more transport protocol packets stored in the transport protocol packet buffer to the second node via the transport protocol tunnel connection in response to the received one or more transport protocol request packets.

73. The messaging system as recited in claim 55, wherein the transport protocol is Hypertext Transport Protocol (HTTP).

74. The messaging system as recited in claim 55, wherein the transport protocol is one of UDP (User Datagram Protocol), IrDA (Infrared Data Association), SNA (Systems Network Architecture), IPX (Internetwork Packet eXchange), and Bluetooth.

75. A tangible, computer-readable medium comprising program instructions, wherein the program instructions are computer-executable to implement:
establishing a transport protocol tunnel connection from a first node in a messaging system to a second node in the messaging system, wherein the second node is a messaging server configured to receive messages from a plurality of clients and deliver the messages to specified ones of a plurality of recipients according to a standard messaging API (application programming interface);
generating a messaging system message on the first node according to the standard messaging API of the messaging sever;
generating one or more transport protocol packets, wherein the one or more transport protocol packets each includes at least a part of the messaging system message; and
transmitting the one or more transport protocol packets to the second node via the transport protocol tunnel connection;
wherein the transport protocol tunnel connection provides full-duplex transmission of messaging system messages between the first node and the second node, and wherein the transport protocol tunnel connection further provides delivery of the messaging system messages in the sequence in which the messaging system messages are generated;
generating on the second node an acknowledgment transport protocol packet to indicate successful receipt of the one or more transport protocol packets including the messaging system message, wherein the acknowledgement transport protocol packet includes information indicating available space in a receive buffer on the second node.

76. The tangible, computer-readable medium as recited in claim 75, wherein the transport protocol tunnel connection passes through a Web server, wherein the second node is a broker in the messaging system, and wherein, in said transmitting the one or more transport protocol packets to the second node, the program instructions are further computer-executable to implement:
transmitting the one or more transport protocol packets to the Web server; and
the Web server forwarding the one or more transport protocol packets to the broker via a Transmission Control Protocol (TCP) connection portion of the transport protocol tunnel connection between the Web server and the broker.

77. The tangible, computer-readable medium as recited in claim 75, wherein the first node is a client in the messaging system, wherein the second node is a broker in the messaging system, wherein the transport protocol tunnel connection passes through a proxy server and a Web server, and wherein, in said transmitting the one or more transport protocol packets to the broker via the transport protocol tunnel connection, the program instructions are further computer-executable to implement:
transmitting the one or more transport protocol packets from the client to the proxy server;

transmitting the one or more transport protocol packets from the proxy server to the Web server; and the Web server forwarding the one or more transport protocol packets to the broker;

wherein the transport protocol tunnel connection passes through at least one firewall between the proxy server and the Web server.

78. The tangible, computer-readable medium as recited in claim 75, wherein the program instructions are further computer-executable to implement:

receiving the transmitted one or more transport protocol packets on the second node;

storing the messaging system message from the one or more transport protocol packets in a receive buffer on the second node;

transmitting the acknowledgement transport protocol packet to the first node via the transport protocol tunnel connection;

receiving the transmitted acknowledgement transport protocol packet on the first node;

generating one or more messaging system messages on the first node;

storing the one or more messaging system messages in a transmit buffer on the first node;

determining from the information indicating available space in the receive buffer included in the received acknowledgement transport protocol packet that there is space available to receive the one or more messaging system messages on the second node;

generating a second one or more transport protocol packets, wherein the second one or more transport protocol packets include the one or more messaging system messages; and transmitting the second one or more transport protocol packets to the second node via the transport protocol tunnel connection.

79. The tangible, computer-readable medium as recited in claim 75, wherein the first node is a client in the messaging system, wherein the transport protocol tunnel connection passes through a Web server, and wherein the program instructions are further computer-executable to implement:

receiving the transmitted one or more transport protocol packets on the second node;

storing the messaging system message from the one or more transport protocol packets in a receive buffer on the second node;

the second node generating an acknowledgement transport protocol packet to indicate successful receipt of the one or more transport protocol packets including the messaging system message;

transmitting the acknowledgement transport protocol packet to the Web server;

storing the acknowledgement transport protocol packet in a transport protocol packet buffer on the Web server;

the client sending a transport protocol request packet to the Web server; and the Web server transmitting the acknowledgement transport protocol packet stored in the transport protocol packet buffer to the client via the transport protocol tunnel connection in response to the transport protocol request packet.

80. The tangible, computer-readable medium as recited in claim 75, wherein the transport protocol is Hypertext Transport Protocol (HTTP).

* * * * *

UNITED STATES PATENT AND TRADEMARK OFFICE
CERTIFICATE OF CORRECTION

PATENT NO. : 7,117,267 B2 Page 1 of 1
APPLICATION NO. : 09/894318
DATED : October 3, 2006
INVENTOR(S) : Shailesh S. Bavadekar It is certified that error appears in the above-identified patent and that said Letters Patent is hereby corrected as shown below:

In the Claims:

Claim 12, col. 22, line 29, please delete "arid" and insert --and-- in place thereof.

Claim 55, col. 29, line 11, please delete "packer" and insert --packet-- in place thereof.

Signed and Sealed this

Twenty-sixth Day of December, 2006

JON W. DUDAS
*Director of the United States Patent and Trademark Office*